(12) United States Patent
McKinley et al.

(10) Patent No.: US 8,355,525 B2
(45) Date of Patent: Jan. 15, 2013

(54) PARALLEL PROCESSING OF DIGITAL WATERMARKING OPERATIONS

(75) Inventors: Tyler J. McKinley, Lake Oswego, OR (US); William C. Hein, III, Glenmoore, PA (US); Tony F. Rodriguez, Portland, OR (US); Alastair M. Reed, Lake Oswego, OR (US); Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 2525 days.

(21) Appl. No.: 10/053,488

(22) Filed: Nov. 2, 2001

(65) Prior Publication Data

US 2002/0120849 A1 Aug. 29, 2002

Related U.S. Application Data

(63) Continuation-in-part of application No. 09/706,505, filed on Nov. 2, 2000, and a continuation-in-part of application No. 09/503,881, filed on Feb. 14, 2000, now Pat. No. 6,614,914.

(60) Provisional application No. 60/327,687, filed on Oct. 5, 2001.

(51) Int. Cl.
*G06K 9/00* (2006.01)
*G06K 9/36* (2006.01)
*G09C 3/00* (2006.01)

(52) U.S. Cl. ............... 382/100; 382/232; 380/54

(58) Field of Classification Search ............ 382/100, 382/232; 380/54, 279, 278; 707/10, 104.1; 709/202, 201; 713/176, 155, 156, 193, 189
See application file for complete search history.

(56) References Cited

U.S. PATENT DOCUMENTS 3,845,391 A 10/1974 Crosby
5,606,609 A 2/1997 Houser et al.
5,627,967 A 5/1997 Dauerer et al.
5,636,292 A 6/1997 Rhoads
5,768,426 A 6/1998 Rhoads
5,857,038 A 1/1999 Owada et al.

(Continued)

FOREIGN PATENT DOCUMENTS

EP 1223742 7/2002

(Continued)

OTHER PUBLICATIONS

Zhao et al., "Digital Watermark Mobile Agents," Proc. of NISSC'99, Arlington, VA, Oct. 18-21, 1999, pp. 138-146.

(Continued)

*Primary Examiner* — Wenpeng Chen

(57) ABSTRACT

A method of segmenting a media signal for parallel watermarking operations sub-divides the media signal into segments, distributes the segments to parallel processors, and performs parallel digital watermark operations on the segments in the parallel processors. These parallel processors may comprise separate threads of execution on a processing unit, or several execution threads distributed to several processing units. In one enhancement, the method prioritizes the segments for watermarking operations. This enables finite processing resources to be allocated to segments in order of their priority. Further, processing resources are devoted to segments where the digital watermark is more likely to be imperceptible and/or readable. A system for distributed watermark embedding operations includes a watermark signal generator, a perceptual analyzer and a watermark applicator. The system supports operation-level parallelism in the concurrent operation of watermark embedder modules, and data parallelism in the concurrent operation of these modules on segments of a media signal to be embedded with an imperceptible digital watermark.

8 Claims, 5 Drawing Sheets

U.S. PATENT DOCUMENTS

| | | | |
|---|---|---|---|
| 5,862,260 | A | 1/1999 | Rhoads |
| 5,905,800 | A | 5/1999 | Moskowitz et al. |
| 5,960,081 | A * | 9/1999 | Vynne et al. .................. 713/176 |
| 6,122,403 | A | 9/2000 | Rhoads |
| 6,125,388 | A | 9/2000 | Reisman |
| 6,229,924 | B1 | 5/2001 | Rhoads et al. |
| 6,243,480 | B1 | 6/2001 | Zhao et al. |
| 6,249,870 | B1 | 6/2001 | Kobayashi et al. |
| 6,285,774 | B1 | 9/2001 | Schumann et al. |
| 6,307,949 | B1 | 10/2001 | Rhoads |
| 6,311,214 | B1 | 10/2001 | Rhoads |
| 6,314,192 | B1 | 11/2001 | Chen et al. |
| 6,314,457 | B1 | 11/2001 | Schena et al. |
| 6,353,929 | B1 | 3/2002 | Houston |
| 6,374,336 | B1 * | 4/2002 | Peters et al. .................. 711/167 |
| 6,381,341 | B1 | 4/2002 | Rhoads |
| 6,385,329 | B1 | 5/2002 | Sharma et al. |
| 6,389,421 | B1 * | 5/2002 | Hawkins et al. ................. 707/10 |
| 6,408,082 | B1 | 6/2002 | Rhoads et al. |
| 6,421,070 | B1 | 7/2002 | Ramos et al. |
| 6,421,450 | B2 | 7/2002 | Nakano |
| 6,424,725 | B1 | 7/2002 | Rhoads et al. |
| 6,434,561 | B1 | 8/2002 | Durst, Jr. et al. |
| 6,442,284 | B1 | 8/2002 | Gustafson et al. |
| 6,473,516 | B1 * | 10/2002 | Kawaguchi et al. .......... 382/100 |
| 6,490,681 | B1 | 12/2002 | Kobayashi et al. |
| 6,516,079 | B1 | 2/2003 | Rhoads et al. |
| 6,522,770 | B1 | 2/2003 | Seder et al. |
| 6,526,449 | B1 | 2/2003 | Philyaw et al. |
| 6,535,617 | B1 | 3/2003 | Hannigan et al. |
| 6,542,927 | B2 | 4/2003 | Rhoads |
| 6,542,933 | B1 | 4/2003 | Durst, Jr. et al. |
| 6,553,129 | B1 | 4/2003 | Rhoads |
| 6,563,935 | B1 | 5/2003 | Echizen et al. |
| 6,567,533 | B1 | 5/2003 | Rhoads |
| 6,580,808 | B2 | 6/2003 | Rhoads |
| 6,590,996 | B1 | 7/2003 | Reed et al. |
| 6,611,607 | B1 | 8/2003 | Davis et al. |
| 6,611,830 | B2 * | 8/2003 | Shinoda et al. ................... 707/3 |
| 6,614,914 | B1 | 9/2003 | Rhoads et al. |
| 6,647,128 | B1 | 11/2003 | Rhoads |
| 6,647,130 | B2 | 11/2003 | Rhoads |
| 6,650,761 | B1 | 11/2003 | Rodriguez et al. |
| 6,679,420 | B1 | 1/2004 | Lapstun et al. |
| 6,681,028 | B2 | 1/2004 | Rodriguez et al. |
| 6,681,029 | B1 | 1/2004 | Rhoads |
| 6,694,042 | B2 | 2/2004 | Seder et al. |
| 6,694,043 | B2 | 2/2004 | Seder et al. |
| 6,700,990 | B1 | 3/2004 | Rhoads |
| 6,700,995 | B2 | 3/2004 | Reed |
| 6,704,869 | B2 | 3/2004 | Rhoads et al. |
| 6,718,046 | B2 | 4/2004 | Reed et al. |
| 6,718,047 | B2 | 4/2004 | Rhoads |
| 6,721,440 | B2 | 4/2004 | Reed et al. |
| 6,760,463 | B2 | 7/2004 | Rhoads |
| 6,763,123 | B2 | 7/2004 | Reed et al. |
| 6,768,809 | B2 | 7/2004 | Rhoads et al. |
| 6,775,392 | B1 | 8/2004 | Rhoads |
| 6,798,894 | B2 | 9/2004 | Rhoads |
| 6,813,366 | B1 | 11/2004 | Rhoads |
| 6,879,701 | B1 | 4/2005 | Rhoads |
| 6,917,724 | B2 | 7/2005 | Seder et al. |
| 6,920,232 | B2 | 7/2005 | Rhoads |
| 6,947,571 | B1 | 9/2005 | Rhoads et al. |
| 6,975,746 | B2 | 12/2005 | Davis et al. |
| 6,988,202 | B1 | 1/2006 | Rhoads et al. |
| 6,996,252 | B2 | 2/2006 | Reed et al. |
| 7,003,731 | B1 | 2/2006 | Rhoads et al. |
| 7,024,016 | B2 | 4/2006 | Rhoads et al. |
| 7,027,614 | B2 | 4/2006 | Reed |
| 7,035,427 | B2 | 4/2006 | Rhoads |
| 7,044,395 | B1 | 5/2006 | Davis et al. |
| 7,051,086 | B2 | 5/2006 | Rhoads et al. |
| 7,054,465 | B2 | 5/2006 | Rhoads |
| 7,062,069 | B2 | 6/2006 | Rhoads |
| 7,095,871 | B2 | 8/2006 | Jones et al. |
| 7,111,170 | B2 | 9/2006 | Rhoads et al. |
| 7,113,614 | B2 | 9/2006 | Rhoads |
| 7,139,408 | B2 | 11/2006 | Rhoads et al. |
| 7,158,654 | B2 | 1/2007 | Rhoads |
| 7,164,780 | B2 | 1/2007 | Brundage et al. |
| 7,171,016 | B1 | 1/2007 | Rhoads |
| 7,174,031 | B2 | 2/2007 | Rhoads et al. |
| 7,177,443 | B2 | 2/2007 | Rhoads |
| 7,213,757 | B2 | 5/2007 | Jones et al. |
| 7,224,819 | B2 | 5/2007 | Levy et al. |
| 7,248,717 | B2 | 7/2007 | Rhoads |
| 7,261,612 | B1 | 8/2007 | Hannigan et al. |
| 7,305,104 | B2 | 12/2007 | Carr et al. |
| 7,308,110 | B2 | 12/2007 | Rhoads |
| 7,313,251 | B2 | 12/2007 | Rhoads |
| 7,319,775 | B2 | 1/2008 | Sharma et al. |
| 7,330,564 | B2 | 2/2008 | Brundage et al. |
| 7,369,678 | B2 | 5/2008 | Rhoads |
| 7,377,421 | B2 | 5/2008 | Rhoads |
| 7,391,880 | B2 | 6/2008 | Reed et al. |
| 7,406,214 | B2 | 7/2008 | Rhoads et al. |
| 7,424,131 | B2 | 9/2008 | Alattar et al. |
| 7,427,030 | B2 | 9/2008 | Jones et al. |
| 7,433,491 | B2 | 10/2008 | Rhoads |
| 7,444,000 | B2 | 10/2008 | Rhoads |
| 7,444,392 | B2 | 10/2008 | Rhoads et al. |
| 7,450,734 | B2 | 11/2008 | Rodriguez et al. |
| 7,460,726 | B2 | 12/2008 | Levy et al. |
| 7,466,840 | B2 | 12/2008 | Rhoads |
| 7,486,799 | B2 | 2/2009 | Rhoads |
| 7,502,759 | B2 | 3/2009 | Hannigan et al. |
| 7,508,955 | B2 | 3/2009 | Carr et al. |
| 7,515,733 | B2 | 4/2009 | Rhoads |
| 7,536,034 | B2 | 5/2009 | Rhoads et al. |
| 7,537,170 | B2 | 5/2009 | Reed et al. |
| 7,545,952 | B2 | 6/2009 | Brundage et al. |
| 7,564,992 | B2 | 7/2009 | Rhoads |
| RE40,919 | E | 9/2009 | Rhoads |
| 7,602,978 | B2 | 10/2009 | Levy et al. |
| 7,628,320 | B2 | 12/2009 | Rhoads |
| 7,643,649 | B2 | 1/2010 | Davis et al. |
| 7,650,009 | B2 | 1/2010 | Rhoads |
| 7,653,210 | B2 | 1/2010 | Rhoads |
| 7,657,058 | B2 | 2/2010 | Sharma |
| 7,685,426 | B2 | 3/2010 | Ramos et al. |
| 7,693,300 | B2 | 4/2010 | Reed et al. |
| 7,697,719 | B2 | 4/2010 | Rhoads |
| 7,711,143 | B2 | 5/2010 | Rhoads |
| 7,738,673 | B2 | 6/2010 | Reed |
| 7,747,038 | B2 | 6/2010 | Rhoads |
| 7,751,588 | B2 | 7/2010 | Rhoads |
| 7,751,596 | B2 | 7/2010 | Rhoads |
| 7,756,290 | B2 | 7/2010 | Rhoads |
| 7,760,905 | B2 | 7/2010 | Rhoads et al. |
| 7,762,468 | B2 | 7/2010 | Reed et al. |
| 7,787,653 | B2 | 8/2010 | Rhoads |
| 7,792,325 | B2 | 9/2010 | Rhoads et al. |
| 7,822,225 | B2 | 10/2010 | Alattar |
| 7,837,094 | B2 | 11/2010 | Rhoads |
| 7,945,781 | B1 | 5/2011 | Rhoads |
| 7,949,147 | B2 | 5/2011 | Rhoads et al. |
| 7,953,270 | B2 | 5/2011 | Rhoads |
| 7,953,824 | B2 | 5/2011 | Rhoads et al. |
| 7,957,553 | B2 | 6/2011 | Ellingson et al. |
| 7,961,949 | B2 | 6/2011 | Levy et al. |
| 7,970,166 | B2 | 6/2011 | Carr et al. |
| 7,970,167 | B2 | 6/2011 | Rhoads |
| 2001/0001854 | A1 | 5/2001 | Schena et al. |
| 2001/0017885 | A1 | 8/2001 | Asai et al. |
| 2001/0021916 | A1 | 9/2001 | Takai |
| 2001/0021978 | A1 | 9/2001 | Okayasu et al. |
| 2001/0033674 | A1 | 10/2001 | Chen et al. |
| 2001/0034705 | A1 | 10/2001 | Rhoads et al. |
| 2001/0044824 | A1 | 11/2001 | Hunter et al. |
| 2001/0047428 | A1 | 11/2001 | Hunter et al. |
| 2001/0047515 | A1 | 11/2001 | Schreer |
| 2001/0048025 | A1 | 12/2001 | Shinn |
| 2001/0051996 | A1 | 12/2001 | Cooper et al. |
| 2001/0055391 | A1 | 12/2001 | Jacobs |
| 2001/0055407 | A1 | 12/2001 | Rhoads |
| 2002/0009208 | A1 | 1/2002 | Alattar et al. |

| | | |
|---|---|---|
| 2002/0023148 A1 | 2/2002 | Ritz et al. |
| 2002/0032698 A1 | 3/2002 | Cox |
| 2002/0033844 A1 | 3/2002 | Levy et al. |
| 2002/0057823 A1 | 5/2002 | Sharma et al. |
| 2002/0059162 A1 | 5/2002 | Shinoda et al. |
| 2002/0059238 A1 | 5/2002 | Saito |
| 2002/0062382 A1 | 5/2002 | Rhoads et al. |
| 2002/0075298 A1 | 6/2002 | Schena et al. |
| 2002/0080396 A1 | 6/2002 | Silverbrook et al. |
| 2002/0091575 A1 | 7/2002 | Collart |
| 2002/0111912 A1 | 8/2002 | Hunter et al. |
| 2002/0120515 A1 | 8/2002 | Morimoto et al. |
| 2002/0122568 A1 | 9/2002 | Zhao |
| 2002/0131076 A1 | 9/2002 | Davis |
| 2002/0176003 A1 | 11/2002 | Seder et al. |
| 2002/0186886 A1 | 12/2002 | Rhoads |
| 2002/0196272 A1 | 12/2002 | Ramos et al. |
| 2003/0002710 A1 | 1/2003 | Rhoads |
| 2003/0040957 A1 | 2/2003 | Rhoads et al. |
| 2003/0105730 A1 | 6/2003 | Davis et al. |
| 2003/0130954 A1 | 7/2003 | Carr et al. |
| 2004/0005093 A1 | 1/2004 | Rhoads |
| 2004/0190750 A1 | 9/2004 | Rodriguez et al. |
| 2004/0240704 A1 | 12/2004 | Reed |
| 2004/0264733 A1 | 12/2004 | Rhoads et al. |
| 2005/0041835 A1 | 2/2005 | Reed et al. |
| 2005/0058318 A1 | 3/2005 | Rhoads |
| 2005/0192933 A1 | 9/2005 | Rhoads et al. |
| 2006/0013435 A1 | 1/2006 | Rhoads |
| 2006/0041591 A1 | 2/2006 | Rhoads |
| 2006/0251291 A1 | 11/2006 | Rhoads |
| 2007/0055884 A1 | 3/2007 | Rhoads |
| 2007/0108287 A1 | 5/2007 | Davis et al. |
| 2007/0276841 A1 | 11/2007 | Rhoads et al. |
| 2007/0276928 A1 | 11/2007 | Rhoads et al. |
| 2008/0121728 A1 | 5/2008 | Rodriguez |
| 2008/0133555 A1 | 6/2008 | Rhoads et al. |
| 2008/0292134 A1 | 11/2008 | Sharma et al. |
| 2009/0012944 A1 | 1/2009 | Rodriguez et al. |
| 2009/0125475 A1 | 5/2009 | Rhoads et al. |
| 2009/0286572 A1 | 11/2009 | Rhoads et al. |
| 2010/0045816 A1 | 2/2010 | Rhoads |
| 2010/0062819 A1 | 3/2010 | Hannigan et al. |
| 2010/0172540 A1 | 7/2010 | Davis et al. |
| 2010/0198941 A1 | 8/2010 | Rhoads |
| 2011/0007936 A1 | 1/2011 | Rhoads |
| 2011/0026777 A1 | 2/2011 | Rhoads et al. |
| 2011/0051998 A1 | 3/2011 | Rhoads |
| 2011/0062229 A1 | 3/2011 | Rhoads |
| 2011/0091066 A1 | 4/2011 | Alattar |

FOREIGN PATENT DOCUMENTS

| | | |
|---|---|---|
| WO | WO0115021 | 3/2001 |
| WO | WO0171517 | 9/2001 |
| WO | WO0173586 | 10/2001 |

OTHER PUBLICATIONS

Debes et al., "Watermarking Scheme for Large Images Using Parallel Processing," Proc. of SPIE vol. 4314 (2001), pp. 26-34.

Fu et al., "A Survey on Image Segmentation," Pattern Recognition, vol. 13, pp. 3-16, 1981.

Haralick et al., "Image Segmentation Techniques," Computer Vision, Graphics, and Image Processing 29, pp. 100-132, 1985.

Saarinen, "Watersheds in Color Image Segmentation," 1995 IEEE Workshop on Nonlinear Signal and Image Processing, Jun. 1995, 4 pages.

Vincent et al., Watersheds in Digital Spaces: An Efficient Algorithm Based on Immersion Simulations, IEEE Transactions on Pattern Analysis and Machine Intelligence, vol. 13, No. 6, Jun. 1991, pp. 583-598.

U.S. Appl. No. 09/343,101, filed Jun. 29, 1999, Bruce L. Davis, et al.

U.S. Appl. No. 09/343,104, filed Jun. 29, 1999, Tony F. Rodriguez, et al.

U.S. Appl. No. 09/413,117, filed Oct. 6, 1999, Geoffrey B. Rhoads.

U.S. Appl. No. 09/482,749, filed Jan. 13, 2000, Geoffrey B. Rhoads.

U.S. Appl. No. 09/507,096, filed Feb. 17, 2000, Geoffrey B. Rhoads, et al.

U.S. Appl. No. 09/552,998, filed Apr. 19, 2000, Tony F. Rodriguez, et al.

U.S. Appl. No. 09/567,405, filed May 8, 2000, Geoffrey B. Rhoads, et al.

U.S. Appl. No. 09/629,649, filed Aug. 1, 2000, J. Scott Carr, et al.

U.S. Appl. No. 09/633,587, filed Aug. 7, 2000, Geoffrey B. Rhoads, et al.

U.S. Appl. No. 09/689,289, filed Oct. 11, 2000, Geoffrey B. Rhoads, et al.

U.S. Appl. No. 09/697,015, filed Oct. 25, 2000, Bruce L Davis, et al.

U.S. Appl. No. 09/697,009, filed Oct. 25, 2000, Bruce L. Davis, et al.

U.S. Appl. No. 13/084,981, filed Apr. 12, 2011, Geoffrey B. Rhoads.

Examiner's Answer to Reply Brief on U.S. Appl. No. 11/371,374, mailed Jun. 4, 2010.

Reply Brief for U.S. Appl. No. 11/371,374, filed Aug. 4, 2010.

\* cited by examiner

PARALLEL PROCESSING OF DIGITAL WATERMARKING OPERATIONS

RELATED APPLICATION DATA

This patent application is a continuation-in-part of U.S. patent application Ser. No. 09/706,505, filed Nov. 2, 2000, and also claims priority to U.S. Provisional Patent Application No. 60/327,687, filed Oct. 5, 2001, which are hereby incorporated by reference.

This patent application is also a continuation-in-part of U.S. patent application Ser. No. 09/503,881, filed Feb. 14, 2000 (Now U.S. Pat. 6,614,914), which is hereby incorporated by reference.

The subject matter of the present application is related to that disclosed in application Ser. No. 09/571,422, filed May 15, 2000 (Now U.S. Pat. No. 6,947,571), which claims priority to U.S. Provisional Application No. 60/134,782, filed May 19, 1999. The above patent applications are hereby incorporated by reference.

TECHNICAL FIELD

The invention relates to multimedia signal processing, and in particular relates to encoding information into media signals.

BACKGROUND AND SUMMARY

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's application Ser. No. 09/503,881 (Now U.S. Pat. No. 6,614,914), U.S. Pat. Nos. 5,862,260, and 6,122,403, which are hereby incorporated by reference.

Some applications require that a vast number of media signals (e.g., images, video or audio files) each be encoded with unique watermark identifiers. Examples of applications include embedding an identifier in media signals to link them to a network resource for metadata linking (e.g., linking content to a unique web site), for forensic tracking of digitally distributed content, for broadcast monitoring, etc. In such applications, there may be several customers, each requiring large batches of identifiers (IDs). As such, there is a need for an accurate and efficient way of assigning IDs.

Such applications can also create a bottleneck in the content creation and distribution workflow due to the processing resources and time needed to embed unique identifiers into many media signals. There is a need, therefore, for automated processes for facilitating batch embedding of identifiers into media content.

Certain applications require watermark embedding and reading operations be performed on large batches of media signals, or large signals. In some cases, for example, the different watermark signals need to be embedded in multiple copies of the same image, video or audio file. In other cases, a watermark signal needs to be replicated throughout a large signal or batch of signals. The processing requirements are particularly demanding in real time applications, where the embedding or reading operation must occur within a time constraint, so that the operation does not unduly hinder the flow of the media signal for signal capture, rendering, transmission or broadcast. As such, there is a demand for digital watermarking methods and system architectures that facilitate rapid embedding and decoding operations.

The invention provides a method of segmenting a media signal for parallel watermarking operations. The method subdivides the media signal into segments, distributes the segments to parallel processors, and performs parallel digital watermark operations on the segments in the parallel processors. These parallel processors may comprise separate threads of execution on a processing unit, or several execution threads distributed to several processing units.

There are a variety of enhancements to the method. In one enhancement, method prioritizes the segments for watermarking operations. This enables finite processing resources to be allocated to segments in order of their priority. Further, resources are devoted to segments where the digital watermark is more likely to be imperceptible and/or readable.

Another aspect of the invention is a distributed digital watermark embedder. The embedder comprises a watermark signal generator for generating a watermark from a message; a perceptual analyzer for perceptually analyzing a media signal and generating perceptual control parameters used to control application of the watermark to the media signal; and a watermark applicator for receiving the media signal, the watermark and the perceptual control parameters, and for applying the watermark to the media signal according to the perceptual control parameters. The watermark signal generator, the perceptual analyzer and the watermark applicator operate on distributed processors.

Another aspect of the invention is a system for parallel watermark embedding. The system includes a media signal pre-processor operable to receive a media signal and divide the media signal into segments for parallel watermark embedding operations. It also includes a server for distributing the segments to parallel processors for parallel watermark embedding operations.

Further features will become apparent with reference to the following detailed description and accompanying drawings.

DETAILED DESCRIPTION

Figure 1:
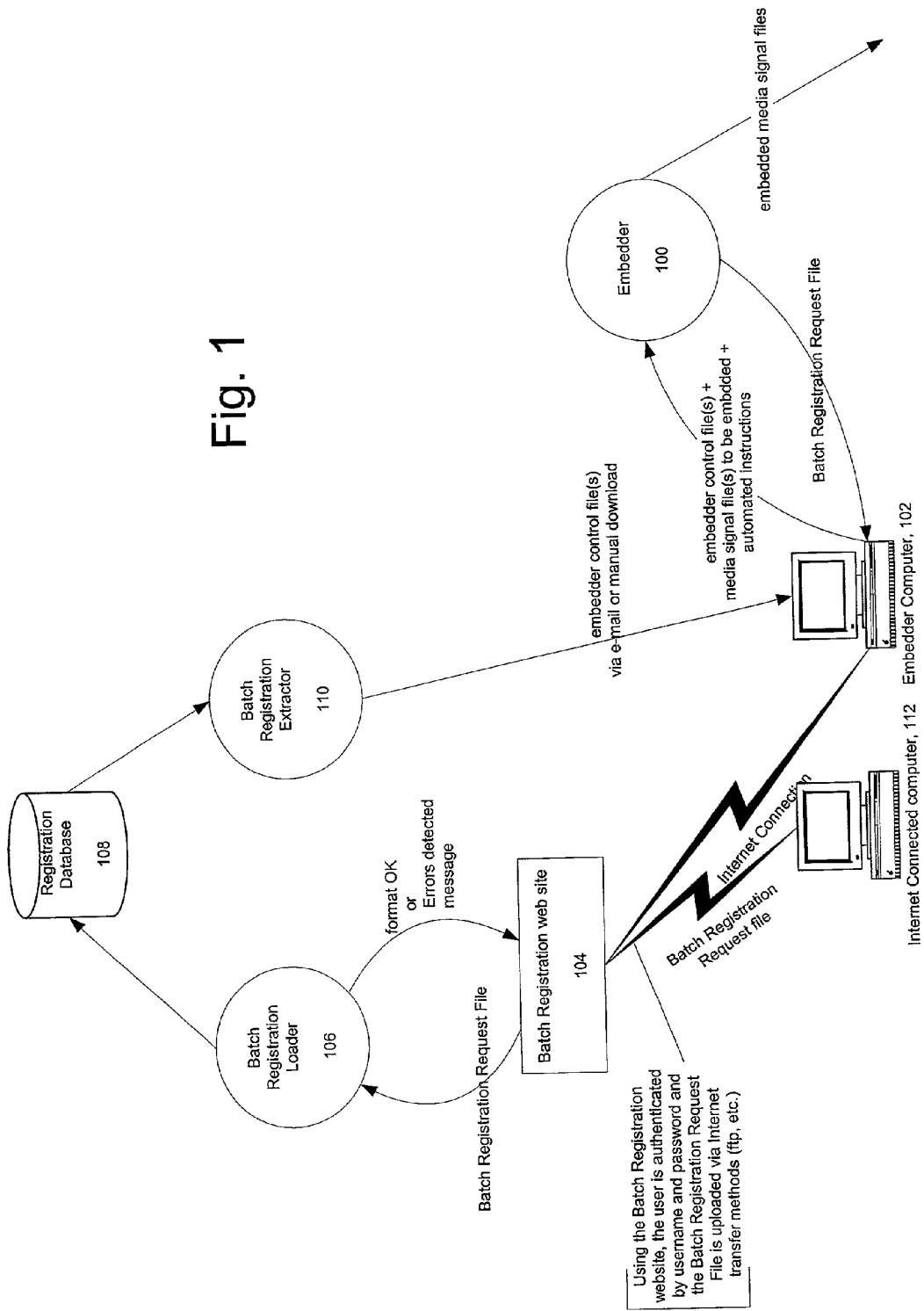
FIG. 1 is a system diagram of a batch identifier registration and watermark embedding system.

FIG. 1 is a system diagram of a batch identifier registration and watermark embedding system. In this system, a batch identifier registration system enables a user to submit a request for a batch of unique identifiers to be embedded in media signals. The user submits a request for a batch of IDs. The batch registration system verifies the accuracy of the request, sends a confirmation, allocates IDs, creates corresponding entries in a registration database, and creates embedder files used in a batch embedding process. The user may then submit a request for embedder files. To perform automated batch embedding, a watermark embedder takes the embedder files and corresponding list of media signal files as input and automatically embeds identifiers supplied in the embedder files into corresponding media signal files. The media signal files may be files including audio, video or still image signals to be embedded with a watermark. A more detailed description follows with reference to FIG. 1.

The process begins when the party wishing to embed multiple watermarks into multiple objects logs on to the batch registration web site 104 using client software executing on a computer (102, 112) connected to the Internet. This client may include, but is not limited to, the embedder computer 102, which provides a means for connecting to the Internet and initiating the log on to the batch registration web site from within the embedder 100 software, or other client software, such as an Internet browser, from another computer 112. Both methods provide the user with a user interface and a template that can be completed to create a valid batch registration request file.

This batch registration file includes either a request to reserve a specific number of watermark identifiers for later embedding or specific information, including a description of the behavior to be associated with the identifiers. One example of the behavior is linking a watermark decoding device to a web site or other network resource associated with a watermark identifier. In this case, the behavior description may include a network address (e.g., IP address, URL of a web site, etc.).

Another example of a behavior is returning related information to the decoding computer, such as a document (HTML document), software program, streaming or file downloading of audio, video, or images. In this case, the behavior description may include the information to be returned, or a reference to the information to be returned, along with instructions for controlling the transfer of the information to the decoding computer. The behavior may also specify that the related information is to be transferred to some device other than the device that decodes the watermark identifier.

Another example of a behavior is launching an email program to send an email to a specified recipient. In this case, the behavior description may include an email address of the intended recipient of the email. The email software presents a user interface to the user of the decoding computer showing an email editing window with an email message including the recipient's email address. This email software may execute on a server and present a web interface to the client, or may run on the client in response to an instruction from the database that maps the identifier to the behavior.

If the batch registration file is being submitted to reserve watermark identifiers only, a subsequent batch registration file with the behavior description, including a behavior and assigned watermark identifier, is submitted to enable the system to associate the behavior with the identifier. In place of the subsequent batch registration file, the user may log into the existing watermark registration website and add the required behavior information, one watermark ID at a time.

The registration system places the identifiers and corresponding behavior descriptions in a database. To initiate a behavior associated with a watermark identifier, a watermark decoding device extracts the identifier from a watermarked media object, sends it to the database. In turn, the database looks up the corresponding behavior description and initiates the behavior or behaviors associated with the identifier. This may include, for example, returning a network address for web linking to the watermark decoding device or a web server. In the former case, the decoding device uses the address to establish a connection with the resource at the address and fetch information or launch a program (such as downloading a media object) at that specified address. In the latter case, the web server forwards information, such as an HTML document, streaming media, etc. to the decoding device.

The batch registration web site provides a web interface, implemented in HTML. This interface may also be implemented in HTML, SHTML, ASP or using other web development methods. The client software and batch registration web site using Internet communication protocols such as HTTP, HTTPS, XML, and TCP/IP.

The user enters his username and password via a web-based user interface displayed on the PC 102 (or 112) and submits them to the web site for authentication.

Upon authentication, the batch registration website 104 presents the user with a user interface screen that allows the user to locate his batch registration request file for uploading to the web site. The user then enters a command to upload the selected request file.

The user provides the information required to locate the file on the user's computer for upload.

The batch registration request file is uploaded into a batch registration loader 106.

The batch registration loader 106 performs a quick scan of the uploaded batch registration request file and reports back to the user any errors in format that it detects. If there are errors, the file is not processed. The loader adds the behavior description and corresponding identifier to a registration database used to process queries from watermark decoding devices.

If the batch registration request file is properly formatted, the embedder receives a confirmation from the batch registration website 104 that the request file has been successfully uploaded and will be submitted for processing by the batch registration loader 106.

The user may now either submit a new batch registration request file or logoff of the batch registration web site 104.

The batch registration loader 106 uses the information contained in the user's uploaded batch registration request file to automatically allocate (register) watermark identifiers in a registration database 108. The identifiers are in the form of unique serial numbers. Once this process is completed, the batch registration loader 106 initiates a request to the batch registration extractor 110 for these new registration entries.

Upon receipt of a request, the batch registration extractor 110 accesses the registration database 108 and creates one or more embedder control file(s) for each of these new registered watermark serial numbers. The embedder control file includes a watermark serial number, name of the file to be embedded, and embedder control instructions. In one implementation, there is a separate embedder control file for each corresponding media signal file to be embedded with a watermark. In an alternative implementation, there is a single file per batch embedding process. This file includes a watermark serial number for each media signal file to be embedded in the batch process, an identifier of the corresponding media signal files, and instructions for embedding the serial numbers into the corresponding media signal files.

Upon completion of this process, the batch registration extractor process sends the embedder control file(s) back to the user via Internet e-mail. Optionally the embedder control file(s) may remain on the batch registration extractor system and will be downloaded to the user, at their discretion, by logging back into the batch registration web site and requesting a manual download of these files.

Once the user/embedder has received the embedder control file(s), it uses these file(s), along with the host media signal file(s) and a set of embedding instructions to the embedder software 100 to instruct the embedder software to automatically embed the list of watermark serial numbers included in the embedder control file(s) into the listed media signal files, producing a set of watermark-embedded media signal files.

As alternative to embedding on the user's computer, the batch registration system may supply the embedder control files to a different, perhaps Internet server-based embedder computer. One advantage of this approach is to perform embedding of large batches on a more powerful computer or array of computers. In particular, a computer with multiple processors or an array of computers can embed watermark messages into corresponding media signal files in parallel processes. For large media signal files, or files that will be embedded with multiple, and potentially different watermark messages, parallel embedding processes can embed these watermark messages into different parts of a media signal a single file in parallel. For example, a still image typically is divided into contiguous blocks of pixels, each carrying a watermark message. Similarly, temporal or spatial regions of a sequence of video frames can be subdivided and embedded with the same or different watermark messages. In video, for instance, one sequence of frames may be linked to a first web site relating to the content in that sequence, while another sequence may be linked to a second web site relating to the content in that sequence. A similar approach may be applied to segments of a music file, or different music tracks in a file having the songs of a particular CD.

Of course, if the user/device supplying the media signal files for embedding and the embedder computer are in separate locations, the system needs to facilitate the transfer of media signal files from the user's device to the embedder computer and then back to the desired location, such as a content distributor, printer, publisher, CD or DVD manufacturing facility, streaming media server system, etc. The files may be transferred using Internet communication protocols like FTP. In addition, the embedder computer can be implemented within the same site of the registration computer system. The registration system computer may provide an address or pointer of the embedder control files and media signal files to the embedder computer, enabling it to fetch both and perform embedding operations one the media signals as specified in the embedder control files.

The embedder software 100 may be adapted for different media signal types. As noted, particular techniques for embedding and detecting imperceptible watermarks in media signals are detailed in the assignee's application Ser. No. 09/503,881 (Now U.S. Pat. No. 6,614,914) and U.S. Pat. No. 5,862,260. Alternative watermark embedding technologies may be used as well. In an implementation for still images, the watermark message is repeatedly embedded in contiguous blocks of pixels of the still image. For print media applications, the watermark survives transformations associated with printing the watermarked image and later scanning the image as part of the process of capturing a digital image from which the watermark identifier is extracted.

In an implementation for audio signals, such as music files, the watermark message is repeatedly embedded in contiguous segments of the audio signal. The watermark is designed to survive transformations typical in the application, such as broadcast transformations, compression, digital to analog and analog to digital conversion, streaming delivery over a computer network, etc.

In an implementation for video signals, such as movie files, the watermark message is repeatedly embedded in temporal and spatial regions of the video signal. The watermark is designed to survive transformations typical in the application, such as broadcast transformations, compression, digital to analog and analog to digital conversion, streaming delivery over a computer network, etc.

In each case, the watermark message comprises a serial number and possibly additional information such as copy or rendering control commands, content type flags (like content rating flags for adult content), error detection codes, calibration or synchronization codes, etc. While the batch embedding application described above encodes serial numbers used to link the content with machine behaviors like web site linking, the system may be used to encode a variety of message information, including copy control information, alteration detection information used to detect signal alteration. In addition, the watermark message embedded throughout a media signal file may vary from one region or block of the file to the next.

In still images, audio and video, the embedder control file indicates the message or messages to be embedded. The embedder control file may also specify where to put each message, such as which pixel blocks for still images, which pixel blocks and frames for video, and which audio segments for an audio signal. In temporal signal content, like audio or video, the embedder control file acts as an Edit Decision List (EDL), which specifies the message and the time stamp indicating the start and end of the signal segment where the message is to he embedded. The EDL may also include the behavior to be associated with each message, such as a URL for linking a web site at the URL to a particular piece of content, HTML content with additional links that give the user of the watermark decoder the option to select a behavior to be activated at the time of watermark decoding, etc.

Authentication of Users of the Registration Database

The ID registration process described above implements user authentication through the use of a username/password log in scheme and augments that security through the use of "roles". "Roles" come into play to limit the ability of a subordinate organization, such as an Ad Agency or web site design firm, from accessing and/or updating watermark registration information input by a superior organization (in this example, the content publisher). For watermark enabled printed advertisements, a typical hierarchy of the "roles" would be—customer then Agency then pre-press.

As an additional measure, the registration system maintains an audit trail of each set of watermark information from creation through update to deletion.

Figure 2:
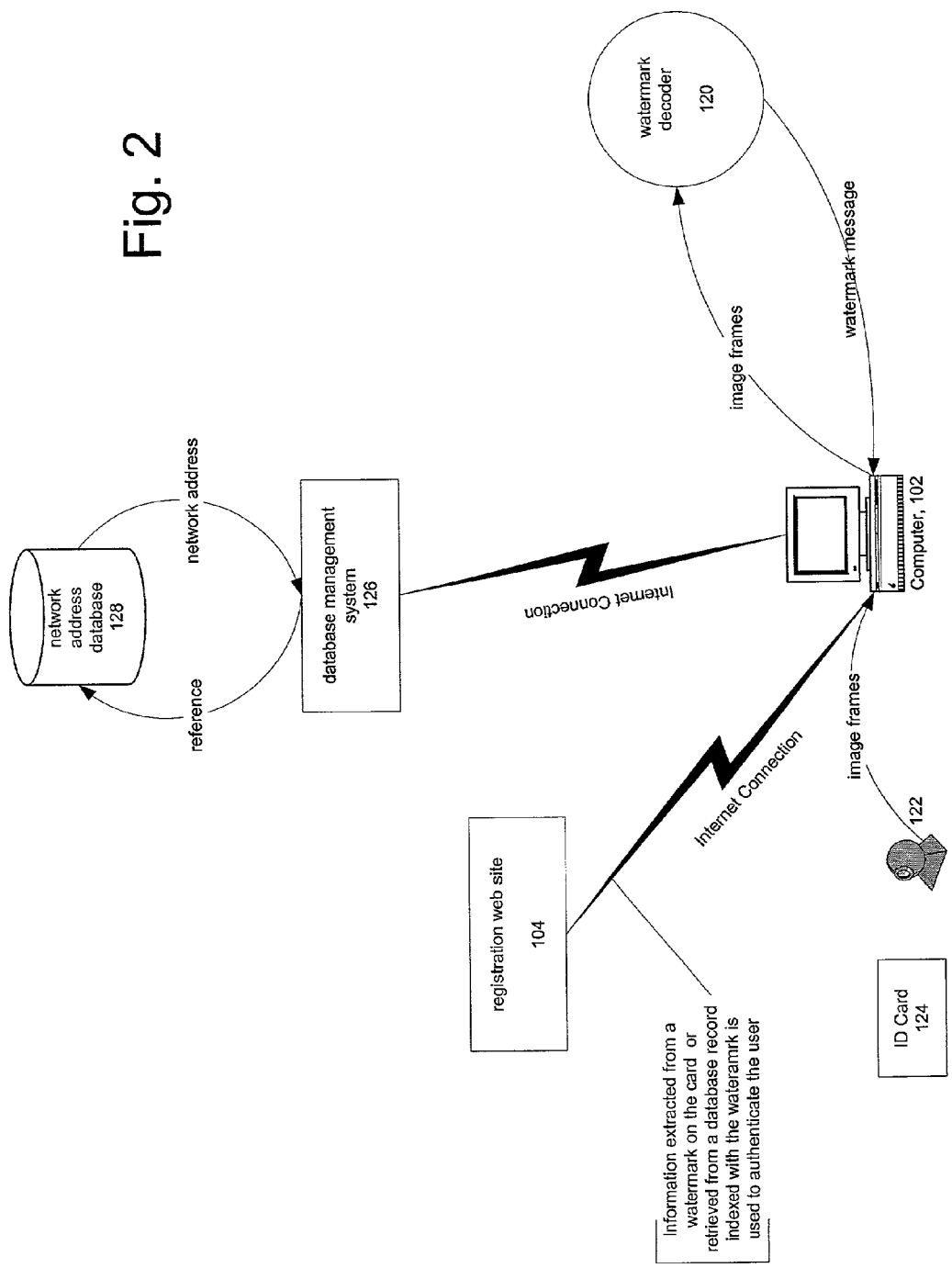
FIG. 2 is a system diagram showing how the user authentication process employed in FIG. 1 can be enhanced using watermarked identity cards.

The use of watermarked identity cards further enhances the security of the authentication process. FIG. 2 is a system diagram showing how the registration process can be enhanced using watermarked identity cards. In one authentication scheme, the controlling authority for the registration database issues identity cards to authorized users. The identity cards have a unique watermark embedded within an image on each card. In this scheme, the user uses this card to access the registration system (e.g., the registration web site 104) by using a watermark decoder 120 connected to an image capture device. In the system shown in FIG. 2, the watermark decoder is implemented in a software application program executing in the user's computer. This application program extracts watermark messages from image frames captured of watermarked images by a PC Camera 122 or other image capture device coupled to the computer via a wire or wireless connection (e.g., firewire, USB, Bluetooth, etc.).

When prompted for a username by the web site, the user shows the card 124 to the PC camera to "read" that watermark, carrying a message identifying attributes of the user (e.g., company name, etc.) attempting to log in. The watermark decoder 120 reads image frames from the PC camera 122, extracts the watermark message embedded in the frames and forwards it to the registration web site 104 via an Internet connection. For corporate users, a corporate-wide password may be used to keep the administration of the passwords as unobtrusive as possible.

While the card allows the user to log in as representing their company (and therefore is granted the "role" and rights of that company while accessing the registration functions), the registration system 104 tracks their log in and actions on an individual basis (the cards are all unique). This scheme requires users to present a valid "identity" card to an image capture device and enter a matching, valid corporate password to access the system.

A variant of the first scheme is to modify the registration log at the registration web site to use information directly in the registration database to authenticate the user. One such variant is described below:

1. The user shows the "identity" card 124 to the camera 122 using the watermark decoder program 120, which displays a window on the computer's monitor showing the image frames captured by the camera;

2. The watermark decoder program 120 links the user to the registration web site 104. In particular, the watermark on the identity card carries a watermark message including a URL or reference to a network address in a database. In the former case, the watermark decoder uses the URL to establish a connection with the registration web site 104. The decoder may pass the URL to an Internet browser to establish the connection or may establish the connection itself. In the latter case, the watermark decoder 120 sends the reference to the network address to a database management system 126, which looks up the corresponding network address in a database 128. In one implementation, the database management system executes on an Internet server at an IP address known to the watermark decoder. The watermark decoder establishes an Internet connection with the DBMS 126 and forwards the reference extracted from the watermark message, optionally with other information from the watermark or user. The DBMS uses the reference to look up a corresponding network address (URL or IP address) of the registration website. It then either returns the network address of the registration web site to the watermark decoder or routes an HTTP request to the registration web site along with the user's IP address, which in turn, forwards a registration web page to the user's computer using the IP address of the user's computer. In the case where the DBMS returns the network address to the user's computer for re-direction, the decoder program uses the address to establish an Internet connection with the registration web site.

3. Now, in addition to having the URL for this serial number, the serial number found on the "identity" card is also used to identify the user's company (the one assigned to this card) obviating the need for a username prompt at all. This serial number along with additional information embedded in the watermark on the card may be used to authenticate the user and personalize the registration process to that user. For example, the HTML interface presented to the user by the registration web site may be personalized for the user based on the embedded watermark information in the user's card or information linked to the embedded information. The registration web site may be personalized by showing the user status information for previous registration transactions, and batch embedding projects.

Additional information in the database 128 may be used to authenticate the user or personalize the registration process. For example, the database entry found by looking up the reference may include user information that identifies the user or his or her organization to the registration web site. This information may be re-directed directly to the registration web site or indirectly by passing it back to the user's computer, which then forwards it to the registration web site.

4. Once re-directed to the registration web site, the user enters the appropriate password to complete authentication and proceeds with the registration process.

Applications

There are a number of applications where many different identifiers need to be assigned to media objects, or different behaviors need to be assigned to the same or related media objects. One such application is where an entity would like to personalize the behavior associated with media objects. In particular, the customer seeking to embed large numbers of media objects would like to personalize the behavior associated with the media objects to particular individuals.

In the print media industry, one such example is to mark a page of a printed object, such as a phone directory, direct mail piece, magazine, etc., that includes a watermark with a behavior that is uniquely associated with an individual.

There are at least two different approaches to implement this functionality using the system described above. One approach is to assign different identifiers to each individual, and assign user specific behavior with each of these identifiers. For example, the embedding entity, such as a printer or publisher, could assign a different URL to fetch a different web page for each identifier. Another approach is to assign different identifiers to each individual, and include a unique index in the behavior description. In this second approach, the embedding entity could decide to associate the same URL with each of these identifiers, but then specify that the database forward the unique index in response to a decoding operation on the identifier. The web server at the specified URL to which the decoding client or registration database forwards a request then uses the unique index to perform a user-specific behavior, such as returning a user specific web page, or other content. In this second approach, the unique index enables the operator of the web server at the specified URL to determine which behaviors to associate with a particular index.

Here is how these two approaches operate:

1. An embedding entity requests many, many unique identifiers from the registration system for watermark embedding.

2. The embedding entity embeds these unique identifiers in each printed piece and distributes the watermarked objects.

3. The consumer uses a watermark decoder device (e.g., image watermark decoder software executing on a computer connected to an image capture device) to extract an identifier from individualized, watermarked object.

4. The watermark decoder reads the watermark, including the identifier, and forwards a request for the associated behavior (e.g., web address) to the registration database via an internet connection between the decoder and database management server.

5. The database management server looks up the individualized behavior (e.g., web address (complete or with a unique index attached)) and returns it to the decoder device.

6. The decoder device performs the behavior (e.g., redirects the user to the supplied web address (the address now has enough information to uniquely identify the user)). To redirect the user, the decoder device sends the address to a web server at the supplied address, which then looks up a corresponding user-specific web page using the address and returns the web page to the decoder device for rendering. As an alternative, the database management server may send the address directly to the web server, along with the IP address of the decoder device. The web server, in turn, forwards a user specific web page to the decoder device at the specified IP address.

The specific components involved in performing the behavior depend on the behavior and its implementation. The behavior may include launching a program on a server that interacts with a client module executing on the decoder device, such as an Internet browser that displays information from the server, an email client that sends an email via an email program on the server, and a media player that receives and renders media content (such as streaming audio or video) via a media object server.

7. The behavior is specific to the user because the identifier is associated with that user (e.g., the identifier is associated with a personalized web page that welcomes the user with user specific information).

While the above example is directed to watermarked printed objects, the approach applies to other watermarked objects, including both electronic objects like video, image and audio files, and physical objects, like packaging, stickers, documents, etc. In addition, it applies to different behaviors beyond web linking and re-direction, such as multimedia content streaming, email personalization, etc.

An additional specific example may help to further illustrate the methods described above. In this example, an operator of an interactive web site allows user to connect to the interactive web site via a client, such as an Internet browser through a web interface, and specify preferences to create personalized products or services. In particular, the web site enables the user to design a product or service of a particular type by specifying various attributes of that item. For example, the product may be a house, with attributes such as a particular architecture, color, layout, square footage, etc. The web site acts as a powerful sales and marketing tool to promote products or services tailored to the users' tastes. The web site forwards specific information provided by users to a printer's computer system over the Internet, instructing the printer to print direct mail pieces for each product designed by the users. In particular, the web site forwards information entered by each user, such as their name, address, product type, product attributes (size, color, model, etc.), product options packages, etc. in a text delimited file.

Using the batch registration database via an Internet connection, the printer computer system registers a unique watermark identifier for each of these files. As part of the registration process, the printer also includes a unique URL or unique index code in the behavior description so that the watermark identifier maps to a personalized web page, such as a web page illustrating the detailed information about the product and its attributes selected by the user.

The printer, through its computer system connected to the Internet, invokes the services of the batch registration and embedding system to create embedder control files and embed the images to be printed on the personalized direct mail pieces. The printer computer system automatically selects the images to be printed on each direct mail piece based on the selections included in the text delimited file from the web site. For example, a particular house style with certain option packages may be associated with one image of a house, while another house is associated with different images.

Once embedded with the watermarks carrying the appropriate unique identifier, the printer proceeds to print the direct mail pieces. Variable printing technology, such as variable offset printing, enables the printing of large batches of items, each with variable content. In the current example, variable offset printing is used to print direct mail pieces that includes images associated with the product type and option packages specified in the text delimited file created at the web site. After printing and mail delivery, the users that created product designs on the web site ultimately receive the direct mail pieces tailored to their product designs.

The direct mail pieces are watermark enabled. To connect to a personal web site related to the direct mail piece, the user shows the watermarked image to an image capture device connected to a computer running compatible watermark decoder software. The watermark decoder extracts the unique identifier, sends it to the database via an Internet connection, and receives a URL and possibly a unique index code in return. The decoder then redirects the URL and index code to the web server at the specified URL on the Internet. The web server then uses the URL and index code (if necessary) to look up and return a personalized web page to the user's computer.

This example extends to many types of products and services that a user might shop for via an interactive web site that enables the user to specify attributes of the product or service.

Watermark Embedder and Reader

Introduction

A digital watermark can be viewed as an information signal that is embedded in a host signal, such as an image, audio, or some other media content. Watermarking systems based on the following detailed description may include the following components: 1) An embedder that inserts a watermark signal in the host signal to form a combined signal; 2) A detector that determines the presence and orientation of a watermark in a potentially corrupted version of the combined signal; and 3) A reader that extracts a watermark message from the combined signal. In some implementations, the detector and reader are combined.

The structure and complexity of the watermark signal can vary significantly, depending on the application. For example, the watermark may be comprised of one or more signal components, each defined in the same or different domains. Each component may perform one or more functions. Two primary functions include acting as an identifier to facilitate detection and acting as an information carrier to convey a message. In addition, components may be located in different spatial or temporal portions of the host signal, and may carry the same or different messages.

The host signal can vary as well. The host is typically some form of multidimensional media signal, such as an image, audio sequence or video sequence. In the digital domain, each of these media types is represented as a multi-dimensional array of discrete samples. For example, a color image has spatial dimensions (e.g., its horizontal and vertical components), and color space dimensions (e.g., YUV or RGB). Some signals, like video, have spatial and temporal dimensions. Depending on the needs of a particular application, the embedder may insert a watermark signal that exists in one or more of these dimensions.

In the design of the watermark and its components, developers are faced with several design issues such as: the extent to which the mark is impervious to jamming and manipulation (either intentional or unintentional); the extent of imperceptibility; the quantity of information content; the extent to which the mark facilitates detection and recovery, and the extent to which the information content can be recovered accurately.

For certain applications, such as copy protection or authentication, the watermark should be difficult to tamper with or remove by those seeking to circumvent it. To be robust, the watermark must withstand routine manipulation, such as data compression, copying, linear transformation, flipping, inversion, etc., and intentional manipulation intended to remove the mark or make it undetectable. Some applications require the watermark signal to remain robust through digital to analog conversion (e.g., printing an image or playing music), and analog to digital conversion (e.g., scanning the image or digitally sampling the music). In some cases, it is beneficial for the watermarking technique to withstand repeated watermarking.

A variety of signal processing techniques may be applied to address some or all of these design considerations. One such technique is referred to as spreading. Sometimes categorized as a spread spectrum technique, spreading is a way to distribute a message into a number of components (chips), which together make up the entire message. Spreading makes the mark more impervious to jamming and manipulation, and makes it less perceptible.

Another category of signal processing technique is error correction and detection coding. Error correction coding is useful to reconstruct the message accurately from the watermark signal. Error detection coding enables the decoder to determine when the extracted message has an error.

Another signal processing technique that is useful in watermark coding is called scattering. Scattering is a method of distributing the message or its components among an array of locations in a particular transform domain, such as a spatial domain or a spatial frequency domain. Like spreading, scattering makes the watermark less perceptible and more impervious to manipulation.

Yet another signal processing technique is gain control. Gain control is used to adjust the intensity of the watermark signal. The intensity of the signal impacts a number of aspects of watermark coding, including its perceptibility to the ordinary observer, and the ability to detect the mark and accurately recover the message from it.

Gain control can impact the various functions and components of the watermark differently. Thus, in some cases, it is useful to control the gain while taking into account its impact on the message and orientation functions of the watermark or its components. For example, in a watermark system described below, the embedder calculates a different gain for orientation and message components of an image watermark.

Another useful tool in watermark embedding and reading is perceptual analysis. Perceptual analysis refers generally to techniques for evaluating signal properties based on the extent to which those properties are (or are likely to be) perceptible to humans (e.g., listeners or viewers of the media content). A watermark embedder can take advantage of a Human Visual System (HVS) model to determine where to place a watermark and how to control the intensity of the watermark so that chances of accurately recovering the watermark are enhanced, resistance to tampering is increased, and perceptibility of the watermark is reduced. Such perceptual analysis can play an integral role in gain control because it helps indicate how the gain can be adjusted relative to the impact on the perceptibility of the mark. Perceptual analysis can also play an integral role in locating the watermark in a host signal. For example, one might design the embedder to hide a watermark in portions of a host signal that are more likely to mask the mark from human perception.

Various forms of statistical analyses may be performed on a signal to identify places to locate the watermark, and to identify places where to extract the watermark. For example, a statistical analysis can identify portions of a host image that have noise-like properties that are likely to make recovery of the watermark signal difficult. Similarly, statistical analyses may be used to characterize the host signal to determine where to locate the watermark.

Each of the techniques may be used alone, in various combinations, and in combination with other signal processing techniques.

In addition to selecting the appropriate signal processing techniques, the developer is faced with other design considerations. One consideration is the nature and format of the media content. In the case of digital images, for example, the image data is typically represented as an array of image samples. Color images are represented as an array of color vectors in a color space, such as RGB or YUV. The watermark may be embedded in one or more of the color components of an image. In some implementations, the embedder may transform the input image into a target color space, and then proceed with the embedding process in that color space.

Digital Watermark Embedder and Reader Overview

The following sections describe implementations of a watermark embedder and reader that operate on digital signals. The embedder encodes a message into a digital signal by modifying its sample values such that the message is imperceptible to the ordinary observer in output form. To extract the message, the reader captures a representation of the signal suspected of containing a watermark and then processes it to detect the watermark and decode the message.

Figure 3:
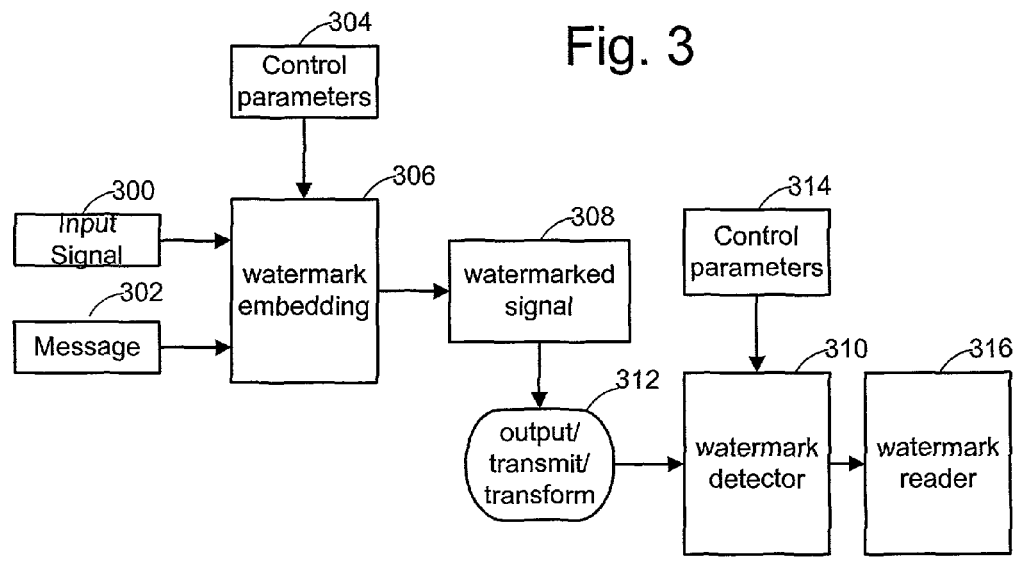
FIG. 3 is a diagram illustrating a digital watermark embedder and reader system.

FIG. 3 is a block diagram showing signal processing operations involved in embedding and reading a watermark. There are three primary inputs to the embedding process: the original, digitized signal 300, the message 302, and a series of control parameters 304. The control parameters may include one or more keys. One key or set of keys may be used to encrypt the message. Another key or set of keys may be used to control the generation of a watermark carrier signal or a mapping of information bits in the message to positions in a watermark information signal.

The carrier signal or mapping of the message to the host signal may be encrypted as well. Such encryption may increase security by varying the carrier or mapping for different components of the watermark or watermark message. Similarly, if the watermark or watermark message is redundantly encoded throughout the host signal, one or more encryption keys can be used to scramble the carrier or signal mapping for each instance of the redundantly encoded watermark. This use of encryption provides one way to vary the encoding of each instance of the redundantly encoded message in the host signal. Other parameters may include control bits added to the message, and watermark signal attributes (e.g., orientation or other detection patterns) used to assist in the detection of the watermark.

Apart from encrypting or scrambling the carrier and mapping information, the embedder may apply different, and possibly unique carrier or mapping for different components of a message, for different messages, or for different watermarks or watermark components to be embedded in the host signal. For example, one watermark may be encoded in a block of samples with one carrier, while another, possibly different watermark, is encoded in a different block with a different carrier. A similar approach is to use different mappings in different blocks of the host signal.

The watermark embedding process 306 converts the message to a watermark information signal. It then combines this signal with the input signal and possibly another signal (e.g., an orientation pattern) to create a watermarked signal 308. The process of combining the watermark with the input signal may be a linear or non-linear function. Examples of watermarking functions include: $S^*=S+gX$; $S^*=S(1+gX)$; and $S^*=S\,e^{gX}$; where $S^*$ is the watermarked signal vector, S is the input signal vector, and g is a function controlling watermark intensity. The watermark may be applied by modulating signal samples S in the spatial, temporal or some other transform domain.

To encode a message, the watermark encoder analyzes and selectively adjusts the host signal to give it attributes that correspond to the desired message symbol or symbols to be encoded. There are many signal attributes that may encode a message symbol, such as a positive or negative polarity of signal samples or a set of samples, a given parity (odd or even), a given difference value or polarity of the difference between signal samples (e.g., a difference between selected spatial intensity values or transform coefficients), a given distance value between watermarks, a given phase or phase offset between different watermark components, a modulation of the phase of the host signal, a modulation of frequency coefficients of the host signal, a given frequency pattern, a given quantizer (e.g., in Quantization Index Modulation) etc.

Some processes for combining the watermark with the input signal are termed non-linear, such as processes that employ dither modulation, modify least significant bits, or apply quantization index modulation. One type of non-linear modulation is where the embedder sets signal values so that they have some desired value or characteristic corresponding to a message symbol. For example, the embedder may designate that a portion of the host signal is to encode a given bit value. It then evaluates a signal value or set of values in that portion to determine whether they have the attribute corresponding to the message bit to be encoded. Some examples of attributes include a positive or negative polarity, a value that is odd or even, a checksum, etc. For example, a bit value may be encoded as a one or zero by quantizing the value of a selected sample to be even or odd. As another example, the embedder might compute a checksum or parity of an N bit pixel value or transform coefficient and then set the least significant bit to the value of the checksum or parity. Of course, if the signal already corresponds to the desired message bit value, it need not be altered. The same approach can be extended to a set of signal samples where some attribute of the set is adjusted as necessary to encode a desired message symbol. These techniques can be applied to signal samples in a transform domain (e.g., transform coefficients) or samples in the temporal or spatial domains.

Quantization index modulation techniques employ a set of quantizers. In these techniques, the message to be transmitted is used as an index for quantizer selection. In the decoding process, a distance metric is evaluated for all quantizers and the index with the smallest distance identifies the message value.

The watermark detector 310 operates on a digitized signal suspected of containing a watermark. As depicted generally in FIG. 3, the suspect signal may undergo various transformations 312, such as conversion to and from an analog domain, cropping, copying, editing, compression/decompression, transmission etc. Using parameters 314 from the embedder (e.g., orientation pattern, control bits, key(s)), it performs a series of correlation or other operations on the captured image to detect the presence of a watermark. If it finds a watermark, it determines its orientation within the suspect signal.

Using the orientation, if necessary, the reader 316 extracts the message. Some implementations do not perform correlation, but instead, use some other detection process or proceed directly to extract the watermark signal. For instance in some applications, a reader may be invoked one or more times at various temporal or spatial locations in an attempt to read the watermark, without a separate pre-processing stage to detect the watermark's orientation.

Some implementations require the original, un-watermarked signal to decode a watermark message, while others do not. In those approaches where the original signal is not necessary, the original un-watermarked signal can still be used to improve the accuracy of message recovery. For example, the original signal can be removed, leaving a residual signal from which the watermark message is recovered. If the decoder does not have the original signal, it can still attempt to remove portions of it (e.g., by filtering) that are expected not to contain the watermark signal.

Watermark decoder implementations use known relationships between a watermark signal and a message symbol to extract estimates of message symbol values from a signal suspected of containing a watermark. The decoder has knowledge of the properties of message symbols and how and where they are encoded into the host signal to encode a message. For example, it knows how message bit values of one and a zero are encoded and it knows where these message bits are originally encoded. Based on this information, it can look for the message properties in the watermarked signal. For example, it can test the watermarked signal to see if it has attributes of each message symbol (e.g., a one or zero) at a particular location and generate a probability measure as an indicator of the likelihood that a message symbol has been encoded. Knowing the approximate location of the watermark in the watermarked signal, the reader implementation may compare known message properties with the properties of the watermarked signal to estimate message values, even if the original signal is unavailable. Distortions to the watermarked signal and the host signal itself make the watermark difficult to recover, but accurate recovery of the message can be enhanced using a variety of techniques, such as error correction coding, watermark signal prediction, redundant message encoding, etc.

One way to recover a message value from a watermarked signal is to perform correlation between the known message property of each message symbol and the watermarked signal. If the amount of correlation exceeds a threshold, for example, then the watermarked signal may be assumed to contain the message symbol. The same process can be repeated for different symbols at various locations to extract a message. A symbol (e.g., a binary value of one or zero) or set of symbols may be encoded redundantly to enhance message recovery.

In some cases, it is useful to filter the watermarked signal to remove aspects of the signal that are unlikely to be helpful in recovering the message and/or are likely to interfere with the watermark message. For example, the decoder can filter out portions of the original signal and another watermark signal or signals. In addition, when the original signal is unavailable, the reader can estimate or predict the original signal based on properties of the watermarked signal. The original or predicted version of the original signal can then be used to recover an estimate of the watermark message. One way to use the predicted version to recover the watermark is to remove the predicted version before reading the desired watermark. Similarly, the decoder can predict and remove un-wanted watermarks or watermark components before reading the desired watermark in a signal having two or more watermarks.

Example Watermark Embedder

Figure 4:
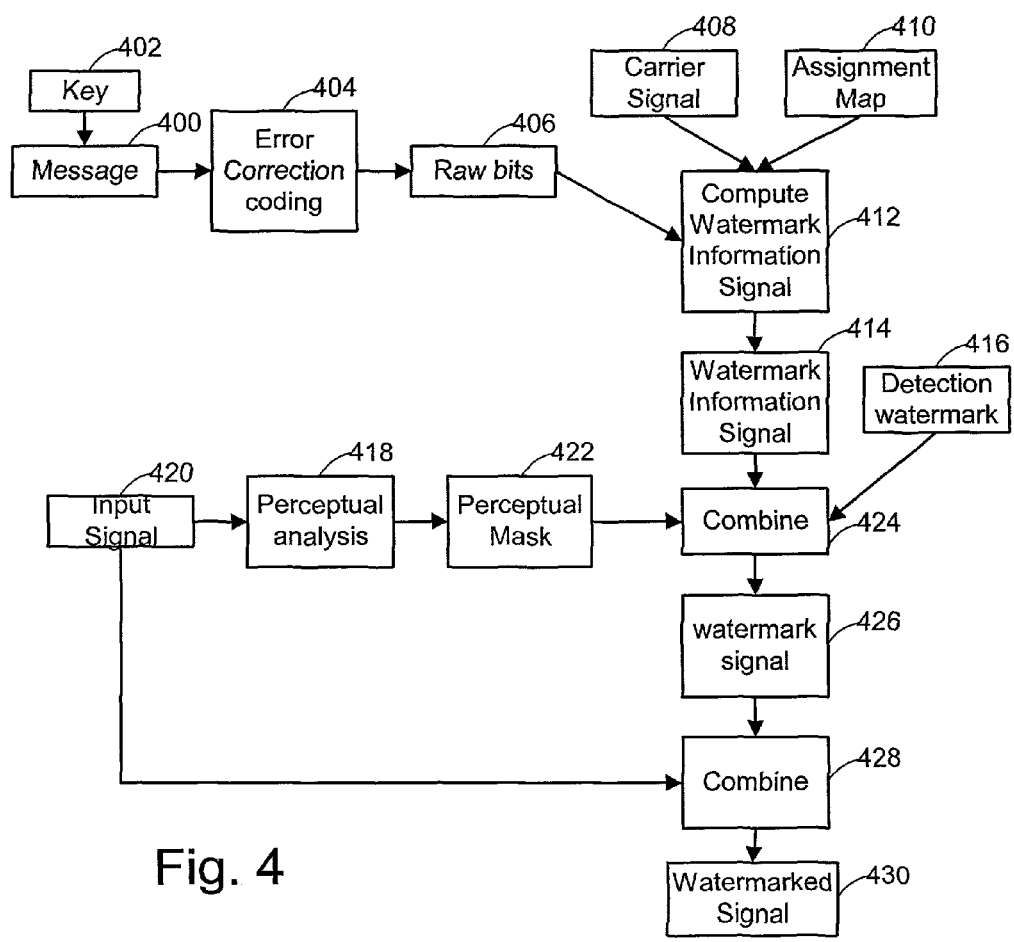
FIG. 4 is a diagram illustrating a digital watermark embedder.

FIG. 4 is a block diagram illustrating an implementation of an exemplary embedder in more detail. The embedding process begins with the message 400. As noted above, the message is binary number suitable for conversion to a watermark signal. For additional security, the message, its carrier, and the mapping of the watermark to the host signal may be encrypted with an encryption key 402. In addition to the information conveyed in the message, the embedder may also add control bit values ("signature bits") to the message to assist in verifying the accuracy of a read operation. These control bits, along with the bits representing the message, are input to an error correction coding process 404 designed to increase the likelihood that the message can be recovered accurately in the reader.

There are several alternative error correction coding schemes that may be employed. Some examples include BCH, convolution, Reed Solomon and turbo codes. These forms of error correction coding are sometimes used in communication applications where data is encoded in a carrier signal that transfers the encoded data from one place to another. In the digital watermarking application discussed here, the raw bit data is encoded in a fundamental carrier signal.

In addition to the error correction coding schemes mentioned above, the embedder and reader may also use a Cyclic Redundancy Check (CRC) to facilitate detection of errors in the decoded message data.

The error correction coding function 404 produces a string of bits, termed raw bits 406, that are embedded into a watermark information signal. Using a carrier signal 408 and an assignment map 410, the illustrated embedder encodes the raw bits in a watermark information signal 412, 414. In some applications, the embedder may encode a different message in different locations of the signal. The carrier signal may be a noise signal, a derivative of the host signal, or some other signal. For each raw bit, the assignment map specifies the corresponding image sample or samples that will be modified to encode that bit.

The embedder depicted in FIG. 4 operates on blocks of image data (referred to as 'tiles') and replicates a watermark in each of these blocks. As such, the carrier signal and assignment map both correspond to an image block of a pre-determined size, namely, the size of the tile. To encode each bit, the embedder applies the assignment map to determine the corresponding image samples in the block to be modified to encode that bit. Using the map, it finds the corresponding image samples in the carrier signal. For each bit, the embedder computes the value of image samples in the watermark information signal as a function of the raw bit value and the value(s) of the corresponding samples in the carrier signal.

To illustrate the embedding process further, it is helpful to consider an example. First, consider the following background. Digital watermarking processes are sometimes described in terms of the transform domain in which the watermark signal is defined. The watermark may be defined in the spatial or temporal domain, or some other transform domain such as a wavelet transform, Discrete Cosine Transform (DCT), Discrete Fourier Transform (DFT), Hadamard transform, Hartley transform, Karhunen-Loeve transform (KLT) domain, etc.

Consider an example where the watermark is defined in a transform domain (e.g., a frequency domain such as DCT, wavelet or DFT). The embedder segments the image in the spatial domain into rectangular tiles and transforms the image samples in each tile into the transform domain. For example in the DCT domain, the embedder segments the image into N by N blocks and transforms each block into an N by N block of DCT coefficients. In this example, the assignment map specifies the corresponding sample location or locations in the frequency domain of the tile that correspond to a bit position in the raw bits. In the frequency domain, the carrier signal looks like a noise pattern. Each image sample in the frequency domain of the carrier signal is used together with a selected raw bit value to compute the value of the image sample at the location in the watermark information signal.

Now consider an example where the watermark is defined in the spatial domain. The embedder segments the image in the spatial domain into rectangular tiles of image samples (i.e. pixels). In this example, the assignment map specifies the corresponding sample location or locations in the tile that correspond to each bit position in the raw bits. In the spatial domain, the carrier signal looks like a noise pattern extending throughout the tile. Each image sample in the spatial domain of the carrier signal is used together with a selected raw bit value to compute the value of the image sample at the same location in the watermark information signal.

With this background, the embedder proceeds to encode each raw bit in the selected transform domain as follows. It uses the assignment map to look up the position of the corresponding image sample (or samples) in the carrier signal. The image sample value at that position in the carrier controls the value of the corresponding position in the watermark information signal. In particular, the carrier sample value indicates whether to invert the corresponding watermark sample value. The raw bit value is either a one or zero. Disregarding for a moment the impact of the carrier signal, the embedder adjusts the corresponding watermark sample upward to represent a one, or downward to represent a zero. Now, if the carrier signal indicates that the corresponding sample should be inverted, the embedder adjusts the watermark sample downward to represent a one, and upward to represent a zero. In this manner, the embedder computes the value of the watermark samples for a raw bit using the assignment map to find the spatial location of those samples within the block.

From this example, a number of points can be made. First, the embedder may perform a similar approach in any other transform domain. Second, for each raw bit, the corresponding watermark sample or samples are some function of the raw bit value and the carrier signal value. The specific mathematical relationship between the watermark sample, on one hand, and the raw bit value and carrier signal, on the other, may vary with the implementation. For example, the message may be convolved with the carrier, multiplied with the carrier, added to the carrier, or applied based on another non-linear function. Third, the carrier signal may remain constant for a particular application, or it may vary from one message to another. For example, a secret key may be used to generate the carrier signal. For each raw bit, the assignment map may define a pattern of watermark samples in the transform domain in which the watermark is defined. An assignment map that maps a raw bit to a sample location or set of locations (i.e. a map to locations in a frequency or spatial domain) is just one special case of an assignment map for a transform domain. Fourth, the assignment map may remain constant, or it may vary from one message to another. In addition, the carrier signal and map may vary depending on the nature of the underlying image. In sum, there many possible design choices within the implementation framework described above.

The embedder depicted in FIG. 4 combines another watermark component, shown as the detection watermark 416, with the watermark information signal to compute the final watermark signal. The detection watermark is specifically chosen to assist in identifying the watermark and computing its orientation in a detection operation. One example of a detection watermark is a pattern of impulse functions in a transform domain.

The embedder makes a perceptual analysis 418 of the input image 420 to identify portions of the image that can withstand more watermark signal content without substantially impacting image fidelity. Generally, the perceptual analysis employs a HVS model to identify signal frequency bands and/or spatial areas to increase or decrease watermark signal intensity to make the watermark imperceptible to an ordinary observer. One type of model is to increase watermark intensity in frequency bands and spatial areas where there is more image activity. In these areas, the sample values are changing more than other areas and have more signal strength. The output of the perceptual analysis is a perceptual mask 422. The mask may be implemented as an array of functions, which selectively increase the signal strength of the watermark signal based on a HVS model analysis of the input image. The mask may selectively increase or decrease the signal strength of the watermark signal in areas of greater signal activity.

The embedder combines (424) the watermark information, the detection signal and the perceptual mask to yield the watermark signal 426. Finally, it combines (428) the input image 420 and the watermark signal 426 to create the watermarked image 430. In the frequency domain watermark example above, the embedder combines the transform domain coefficients in the watermark signal to the corresponding coefficients in the input image to create a frequency domain representation of the watermarked image. It then transforms the image into the spatial domain. As an alternative, the embedder may be designed to convert the watermark into the spatial domain, and then add it to the image.

In the spatial watermark example above, the embedder combines the image samples in the watermark signal to the corresponding samples in the input image to create the watermarked image 430.

The embedder may employ an invertible or non-invertible, and linear or nonlinear function to combine the watermark signal and the input image (e.g., linear functions such as S*=S+gX; or S*=S(1+gX), convolution, quantization index modulation). The net effect is that some image samples in the input image are adjusted upward, while others are adjusted downward. The extent of the adjustment is greater in areas or subbands of the image having greater data hiding capacity (e.g., more signal activity to mask the watermark signal).

Watermark Detector and Reader

Figure 5:
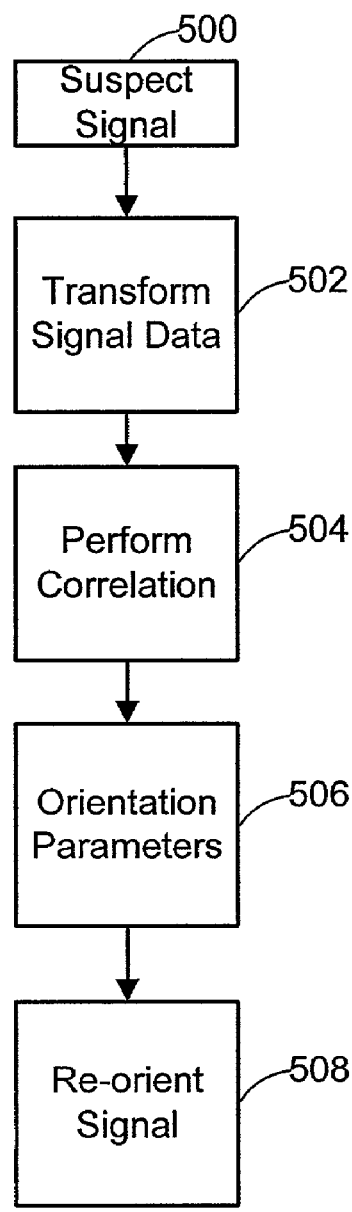
FIG. 5 is a diagram illustrating a digital watermark detector.

FIG. 5 is a flow diagram illustrating an overview of a watermark detection process. This process analyzes image data 500 to search for an orientation pattern of a watermark in an image suspected of containing the watermark (the target image). First, the detector transforms the image data to another domain 502, namely the spatial frequency domain, and then performs a series of correlation or other detection operations 504. The correlation operations match the orientation pattern with the target image data to detect the presence of the watermark and its orientation parameters 506 (e.g., translation, scale, rotation, and differential scale relative to its original orientation). Finally, it re-orients the image data based on one or more of the orientation parameters 508.

Figure 6:
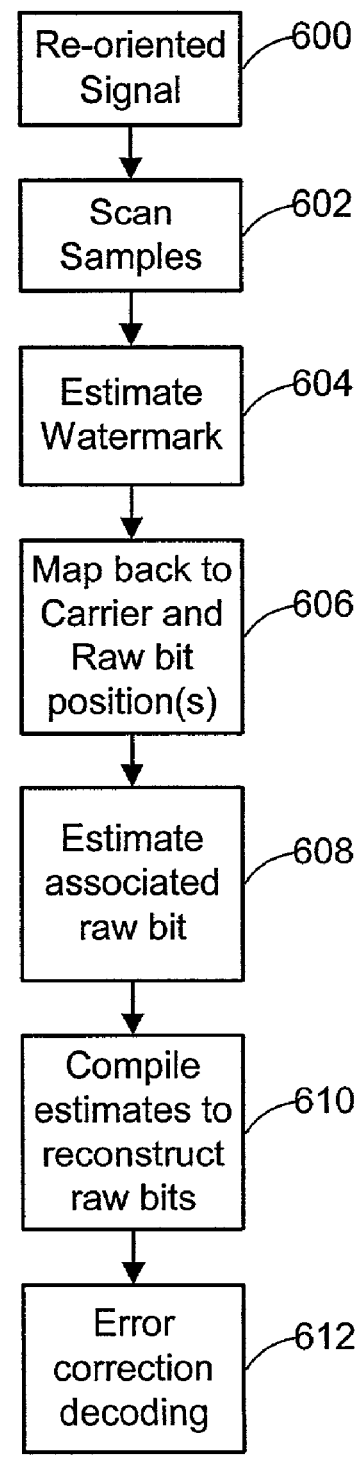
FIG. 6 is a diagram illustrating a message reader for extracting message symbols from an embedded digital watermark.

If the orientation of the watermark is recovered, the reader extracts the watermark information signal from the image data (optionally by first re-orienting the data based on the orientation parameters). FIG. 6 is flow diagram illustrating a process of extracting a message from re-oriented image data 600. The reader scans the image samples (e.g., pixels or transform domain coefficients) of the re-oriented image (602), and uses known attributes of the watermark signal to estimate watermark signal values 604. Recall that in one example implementation described above, the embedder adjusted sample values (e.g., frequency coefficients, color values, etc.) up or down to embed a watermark information signal. The reader uses this attribute of the watermark information signal to estimate its value from the target image. Prior to making these estimates, the reader may filter the image to remove portions of the image signal that may interfere with the estimating process. For example, if the watermark signal is expected to reside in low or medium frequency bands, then high frequencies may be filtered out.

In addition, the reader may predict the value of the original un-watermarked image to enhance message recovery. One form of prediction uses temporal or spatial neighbors to estimate a sample value in the original image. In the frequency domain, frequency coefficients of the original signal can be predicted from neighboring frequency coefficients in the same frequency subband. In video applications for example, a frequency coefficient in a frame can be predicted from spatially neighboring coefficients within the same frame, or temporally neighboring coefficients in adjacent frames or fields. In the spatial domain, intensity values of a pixel can be estimated from intensity values of neighboring pixels. Having predicted the value of a signal in the original, un-watermarked image, the reader then estimates the watermark signal by calculating an inverse of the watermarking function used to combine the watermark signal with the original signal.

For such watermark signal estimates, the reader uses the assignment map to find the corresponding raw bit position and image sample in the carrier signal (606). The value of the raw bit is a function of the watermark signal estimate, and the carrier signal at the corresponding location in the carrier. To estimate the raw bit value, the reader solves for its value based on the carrier signal and the watermark signal estimate. As reflected generally in FIG. 6 (608), the result of this computation represents only one estimate to be analyzed along with other estimates impacting the value of the corresponding raw bit. Some estimates may indicate that the raw bit is likely to be a one, while others may indicate that it is a zero. After the reader completes its scan, it compiles the estimates for each bit position in the raw bit string, and makes a determination of the value of each bit at that position (610). Finally, it performs the inverse of the error correction coding scheme to construct the message (612). In some implementations, probablistic models may be employed to determine the likelihood that a particular pattern of raw bits is just a random occurrence rather than a watermark.

Watermarking Modules

The components of the watermark embedder and reader are implemented in discrete modules to optimize watermark operations. For example, these modules enable the watermark embedder and reader to be executed in distributed computing platforms and parallelized for watermark operation level parallelism. Also, the modules enable larger watermark tasks, such as watermarking large images or large batches of images, video frames or audio files, to be implemented efficiently by reducing redundant watermark operations, and spreading parts of watermarking operations over time and over different processing units and threads of execution.

In one particular implementation, the watermark embedder is implemented in three modules: a watermark signal generator (e.g., elements 400-416 of FIG. 4), a perceptual analyzer (e.g., elements 418-420 of FIG. 4); and a watermark applicator (e.g., elements 424, 428 of FIG. 4). The watermark signal generator creates the watermark information signal, and executes independently of the perceptual analyzer. The perceptual analyzer generates a perceptual mask from the input signal that is used to control the application of the watermark to the input signal. Finally, the applicator applies the watermark (e.g., element 414 and optionally element 416) to the input signal using the perceptual mask to control the watermark signal embedding. The mask indicates locations to embed and/or the acceptable distortion level or intensity of the digital watermark to be embedded in those locations. As such, it is expressed as a vector of embedding control parameters with elements of the vector corresponding to locations in the host media signal.

In our implementation, non-linear functions used to embed the watermark signal into the input signal are aggregated into the applicator, enabling the watermark signal generator and perceptual analyzer to operate independently. As such, the generator creates the watermark information signal, and the perceptual analyzer generates a perceptual mask independently. The applicator then uses both to determine how to modify the input signal to hide the message carried within the watermark information signal.

For batch embedding of signals with many different message payloads, this modular embedder system enables the generation of many different watermark information signals in parallel processing operations. If these different watermark information signals are embedded into copies of the same signal, then the perceptual analyzer need only be executed once for one complete copy of the host signal. To further subdivide the processing task, the copy of the host signal may be segmented into blocks, and the analyzer applied in parallel for each block to produce a sub-mask for each block. The generator and applicator are executed for each copy, yet re-use the perceptual mask (which may be comprised of sub-masks stitched together), which is cached for that copy of the host signal.

Each of the modules may be executed in a distributed computing environment in one or more threads of execution, and on one or more processing units. Watermark operations are assigned to these modules by a load balancer that distributes the operations based on the availability of each to complete the operation. Preferably, the watermark operations operate on segments of the data that have been prioritized according to the methods described in the following section. As such, the system has both watermark operation level parallelism, which divides a watermark embedding or decoding task into operations for distributed processing, and data parallelism, which divides the host media signal into segments for distributed processing.

Media Signal Segmentation for Parallel Processing

Above, we disclosed that a batch registration system could supply embedder control files to a different, perhaps Internet server-based embedder computer. One advantage of this approach is to perform embedding of large batches on a more powerful computer or array of computers. In particular, a computer with multiple processors or an array of computers can embed watermark messages into corresponding media signal files in parallel processes. For large media signal files, or files that will be embedded with multiple, and potentially different watermark messages, parallel embedding processes can embed these watermark messages into different parts of a media signal from a single file in parallel. For example, a still image typically is divided into contiguous blocks of pixels, each carrying a watermark message. Similarly, temporal or spatial regions of a sequence of video frames can be subdivided and embedded with the same or different watermark messages. In video, for instance, one sequence of frames may be linked to a first web site relating to the content in that sequence, while another sequence may be linked to a second web site relating to the content in that sequence. A similar approach may be applied to segments of a music file, or different music tracks in a file having the songs of a particular CD.

An improvement involves optimizing the segmentation of a media signal for parallel processing (or the "prioritization" of signal segments for parallel processing) to facilitate watermark embedding and/or decoding. As noted, one approach to parallel processing is to segment the media signal into parts that can be processed independently and in parallel. As a further enhancement, portions of the signal can be prioritized for processing to optimize use of processing resources. Processing resources such as processing cycles or memory for each watermark operation are finite and may not be sufficient to complete a watermarking operation within the constraints of a particular application. As such, it is useful to be able to prioritize segments of a signal for watermark operations such that the finite resources are applied to higher priority segments. Further, watermark embedding operations can be prioritized for parts of a signal where the watermark is more likely to carry a readable watermark signal, or parts of a signal where the watermark is more likely to be hidden by the host signal. These operations include the modular operations described above, such as watermark generation, perceptual analysis, and watermark application.

A first method prioritizes color planes (e.g., RGB, CMYK, L*a*b*, etc.) according to their importance or watermark carrying significance. For example, a magenta (M) color plane may include a primary watermark component. Or there may be a strong likelihood that a watermark component is recoverable from a yellow (Y) color plane. Accordingly, these color planes are more highly prioritized over other image color planes. Within a highly prioritized plane, the plane itself can be further segmented, e.g., sequentially tiled or segmented according to further prioritization criteria. A related method prioritizes only those color planes that are likely to survive further system processing. To illustrate, a color plane that is going to be sub-sampled in video preferably receives a lower prioritization.

A second method prioritizes image regions according to workflow. In a first example, image segments are prioritized by location in a dot-gain compensation curve; or by the minimum/maximum dot held by a press. In this method, an image analysis pre-press module analyzes the image to identify regions that are likely to be distorted by the print process. For example, some printers cause a color shift and/or introduce dot gain distortion due to the spread of ink dots on paper. Some printing presses have limitations on the maximum and minimum ink dot size that they can create. By analyzing the image, the pre-press module identifies areas where the printer is incapable of accurately reproducing the image on the paper. For example, a watermark is less likely to survive in areas of the image where the image pixels exceed the minimum or maximum dot size. These areas are segmented from other areas such that image regions are prioritized for embedding based on the likelihood that the watermark signal will survive the printer distortion.

A similar concept applies to video and audio watermarking, where segments of the audio and video are prioritized for watermark embedding based on the likelihood of survival of transmission, compression, or rendering distortion. Rendering distortion occurs when the signal is converted to an output form for viewing, such as printing, display or audio playback. Compression distortion occurs when lossy compression, such as MPEG or JPEG compression, is applied to the signal. Transmission distortion occurs when the signal is altered during transmission, such as converting the signal to a broadcast signal, spatial or temporal scaling, digital to analog conversion, etc. Segments of the signal that are more heavily distorted by these processes are identified and given lower priority for watermark embedding operations. As a result, these areas are either not embedded with a watermark to save processing cycles and memory resources, or are embedded after other higher priority regions to ensure that the other regions are more likely to get embedded using finite processing resources.

These prioritization techniques are particularly useful in real time embedding applications, such as transactional watermarking where a signal is embedded as part of the rendering, transmission, broadcast, or signal capture process. In these applications, there is a limited amount of time to embed the signal with a watermark because it must be sent to a subsequent process for rendering, transmission, or broadcast within a predetermined time constraint. In these applications, there is a finite time limit and usually a finite amount of memory and processing cycles that can be devoted to digital watermark embedding. As such, it is useful to identify the segments that are higher priority for embedding by finding the segments that are most likely to result in a readable embedded watermark.

A third method prioritizes an image according to spatially based algorithms. A first implementation prioritizes the image by arranging the image in blocks. The image can be blocked sequentially, starting left to right, top to bottom, etc. Or the image can be blocked according to image areas. Or the image can be segmented by other sequentially blocking methods. A second implementation prioritizes images area according to input "bands" for specific devices. For example, various printers process image information in data bands (or images strips or segments). (Or, thirdly, various bus structures communicate data in bands of data. The image can therefore be parallel processed for watermarking in accordance to these bands, or in accordance to the priority placed on these bans by a specific device.) A fourth implementation prioritizes image segments based on a statistical probability of important content being located in a particular image area. Those regions with a higher probability are processed prior to those with a lower probability. As a fifth implementation, an image is processed according to a function of outside variables. For instance, a stream of content includes an outside indicator evidencing available CPU bandwidth. The stream of content is processed according to the CPU bandwidth indicator. Or the indicator may serve as a traffic cop, directing a next image block or content stream to a particular processor or memory cache. A sixth implementation determines priority based on an image mask. In this implementation, the mask preferably highlights those image areas that should be given priority for embedding or decoding. Color components (CMYK) can be masked over a background spot color, or CMY planes can be masked over a black channel. Or image objects or high variance image areas are masked for watermarking. A seventh implementation uses cascaded low pass filters to reduce image resolution before decoding a watermark. A first stage filter preferably provides a power of 2 reduction, e.g., using a conventional filter (of typical speed and cutoff characteristics), followed by a conventional FIR filter on a smaller portion of the image. For example, a 300 lpi image is reduced to 150 lpi with a 2*2 average. A conventional FIR filter is then applied to the 150 lpi image (e.g., ¼ of the original data).

A fourth method for optimizing segmentation of an image for parallel processing prioritizes image areas based on parameters unique to the embedding hardware. For instance, watermark content (e.g., image data) that is already in a memory cache for another purpose is queued up for embedded prior to non-cached content. Or embedding occurs only on a "page" (or other measurable amount) of memory that is swapped into memory (e.g., for a virtual memory system). Still another implementation embeds a specific bit plane, e.g., by reducing the number of bits "tweaked" (or modified) in order to embed a watermark signal. Another implementation performs a sparse jump by only embedding content that is on memory alignment boundaries for a particular system. Or embedding only image content when there are idle cycles in a CPU(s) (e.g., instead of having the CPU(s) in a penalty state for a memory fetch).

In Assignee's U.S. patent application Ser. No. 09/302,663 (Now U.S. Pat. No. 6,442,284) and Ser. No. 09/945,244 (Now U.S. Pat. No. 7,013,021), we disclosed methods and apparatus to detect the presence of a digital watermark in an image by selecting regions within the image having a high probability of containing the watermark. An image is examined to determine which regions of the image have characteristics indicating that there is a high probability that a watermark signal can be detected in that region of the image. The regions that have a high probability that a watermark can be detected (in contrast to all regions of the image) are examined to find watermark data. The following prioritizing methods are preferably employed after such image or data stream preprocessing.

In a first method, only those image areas that will have minimal visual impact, as defined by variables passed to a human visual system (HVS) model (e.g., lighting, distance, skin-tones, edginess, etc.) are prioritized for watermark decoding. Or the parallel-processing prioritization takes into account other variables in a workflow (e.g., line screen, etc.) to determine what areas of an image to watermark or decode.

A second method proceeds according to a "threat analysis." A "threat" is defined broadly herein and may include a threat of a watermark attack (e.g., a robustness issue), a threat of visual impairment, a threat of image corruption, etc. A first implementation analyzes the most common threats to a specific image and then divides (e.g., segments) the image according to the threat. For each segment, or for a set of segments, a different watermark technique can be applied. A second implementation analyzes what threats are the most effective for different areas of the image and then divides the image accordingly, e.g., divides the image so as to thwart the attacks.

A third method prioritizes images for watermark embedding or decoding based on an image metric. In a first case, the prioritization (or segmentation) is based on a standard image metric such as STDEV, etc. In a second case, the prioritization is based on a probability of a false positive (e.g., detecting a watermark signal when no such signal exists) in an un-watermarked region of an image. In a third case, the prioritization is based on the information carrying capacity of different image regions. Those regions with a higher capacity are prioritized above those with lower capacities.

A related approach is to segment and prioritize media signal regions for watermark embedding and reading operations based on signal characteristics, such as a similarity measure, texture measure, shape measure or luminance or other color value extreme measure. These signal characteristics are preferably selected as criteria for segmentation based on the relationship between these attributes and the data hiding capacity (e.g., perceptual masking based on the Human Visibility or Human Audibility System analyzer), watermark robustness to distortion, and/or digital watermark readability of the host signal.

One example of a signal characteristic segmentation process is a watershed segmentation. See, for example Luc Vincent and Pierre Soille, "Watersheds in Digital Spaces: An efficient Algorithm Based on Immersion Simulations," IEEE Trans. PAMI, Vol13 No 6, June 1991; and Kari Saarinen, "Watersheds in Color Image Segmentation," IEEE Workshop on Nonlinear Signal and Image Processing (NSIP), Halkidiki, Greece, June 1995, which are hereby incorporated by reference.

In one implementation of this method, segmentation of the media signal includes two primary stages: 1) transform the input signal into a signal characteristic space, comprising an array of signal characteristic values computed from corresponding samples of the input signal; 2) group neighboring samples into regions based on the signal characteristics.

This type of segmentation of a media signal based on signal characteristics falls into 3 categories, (1) characteristic feature thresholding or clustering, (2) edge detection, and (3) region extraction. See K. S. Fu and J. K. Mui, "A Survey on Image Segmentation," Pattern Recognition, Vol 13, pp3-16, 1981, which is hereby incorporated by reference. Also, within these methods, many techniques can be employed to compute the quantities used in the methods, e.g., statistics, edge filters, morphological filters, Markov random fields (MRF), fuzzy set theory, and neural nets. See Robert Haralick and Linda Shapiro, "Survey: Image Segmentation Techniques," Computer vision, graphics, and image processing, Vol 29, pp 100-132, 1985, which is hereby incorporated by reference. For our implementation, we use the watershed algorithm, which falls into the clustering segmentation category due to the inherent robustness we have seen with respect to typical noise and distortion processes for imagery. However, other segmentation methods could be employed for computational or robustness reasons with similar results. Furthermore, these segmentation techniques can be combined or layered for additional robustness in specific applications.

The signal characteristic segmentation-based prioritization approach to watermark embedding can provide a number of advantages. One advantage is the ability to hide the auxiliary data more effectively by adapting the watermark signal to the perceptual attributes of a region. Another advantage is the ability to make the watermark more robust to distortions. For example, the segments can be identified even after distortion, and thus, facilitate detecting the watermark and extracting the message carried within it.

A fourth method relies on contextual data to assist in the prioritization of processing an image. In a first case, an image is segmented based on its content. In this case, content can be inferred by surrounding content (e.g., spatially and temporally in a image or video stream). In another case, an image is segmented (or otherwise prioritized) as a function of how the image is being used. For example, in a DVD playback, the image is segmented according to which portions of a video frame are zoomed or highlighted.

Of course, the above methods apply equally as well to video frames, images, and in some cases, to audio.

Operating Environment for Computer Implementations

Figure 7:
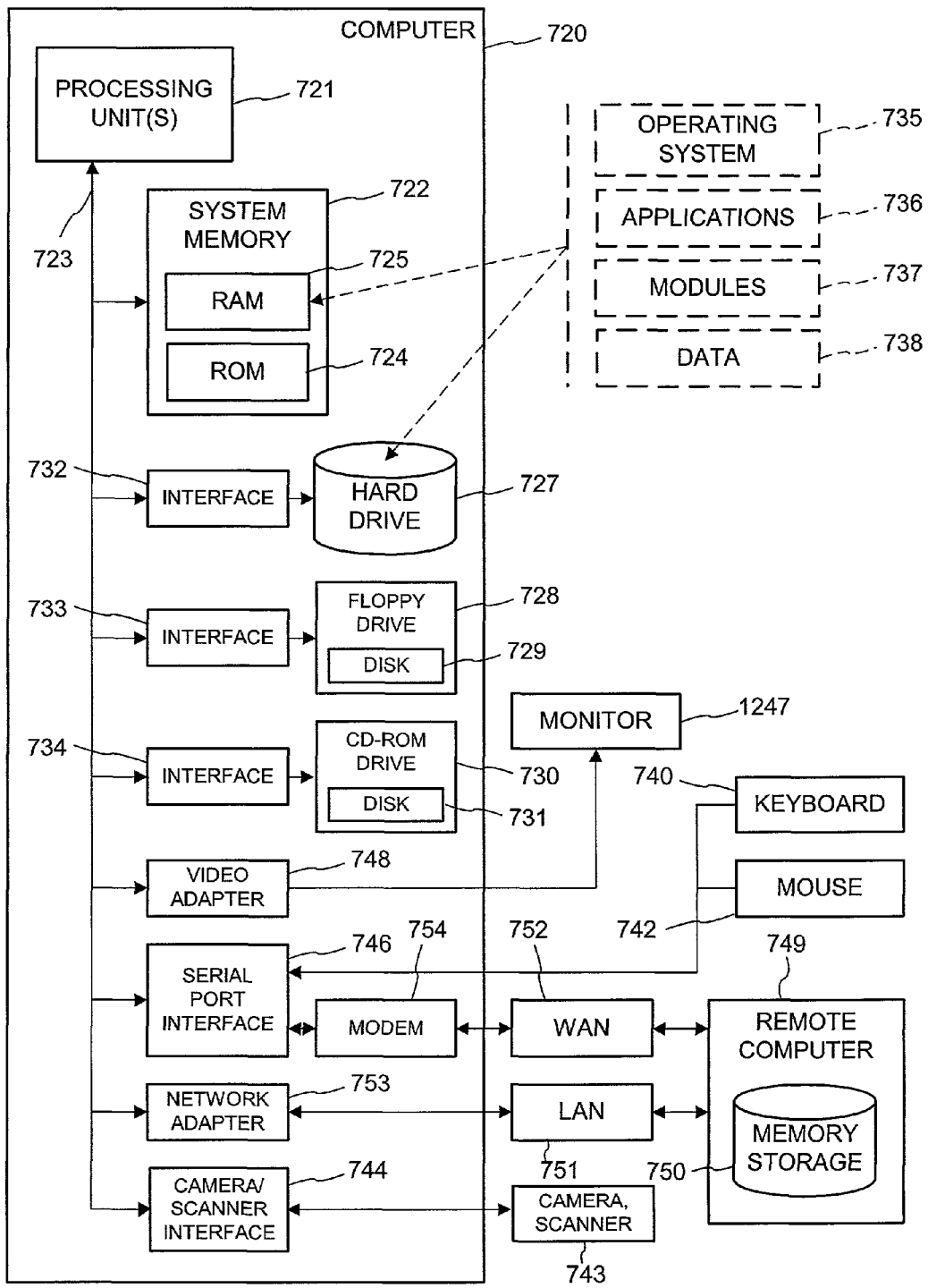
FIG. 7 is a diagram illustrating a computer system, which serves as an operating environment for a batch identifier registration and embedding system as well as a digital watermark reader.
Figure 7:
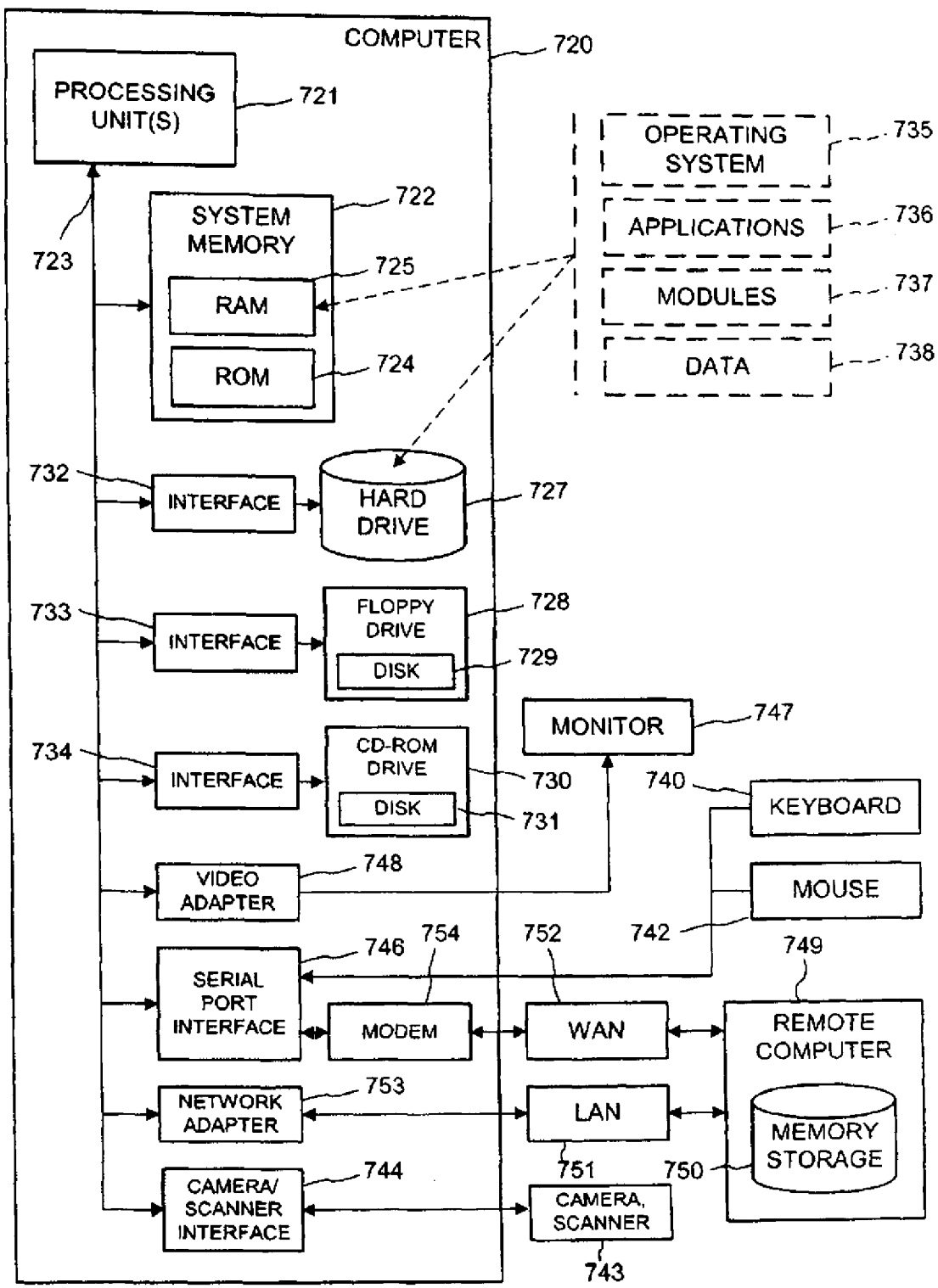

FIG. 7 illustrates an example of a computer system that serves as an operating environment for software implementations of the watermarking systems described above. The embedder and detector implementations are implemented in C/C++ and are portable to many different computer systems. FIG. 7 generally depicts one such system.

The computer system shown in FIG. 7 includes a computer 720, including a processing unit 721, a system memory 722, and a system bus 723 that interconnects various system components including the system memory to the processing unit 721.

The system bus may comprise any of several types of bus structures including a memory bus or memory controller, a peripheral bus, and a local bus using a bus architecture such as PCI, VESA, Microchannel (MCA), ISA and EISA, to name a few.

The system memory includes read only memory (ROM) 724 and random access memory (RAM) 725. A basic input/output system 726 (BIOS), containing the basic routines that help to transfer information between elements within the computer 720, such as during start-up, is stored in ROM 724.

The computer 720 further includes a hard disk drive 727, a magnetic disk drive 728, e.g., to read from or write to a removable disk 729, and an optical disk drive 730, e.g., for reading a CD-ROM or DVD disk 731 or to read from or write to other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer-readable media provide nonvolatile storage of data, data structures, computer-executable instructions (program code such as dynamic link libraries, and executable files), etc. for the computer 720.

Although the description of computer-readable media above refers to a hard disk, a removable magnetic disk and an optical disk, it can also include other types of media that are readable by a computer, such as magnetic cassettes, flash memory cards, digital video disks, and the like.

A number of program modules may be stored in the drives and RAM 725, including an operating system 735, one or more application programs 736, other program modules 737, and program data 738.

A user may enter commands and information into the computer 720 through a keyboard 740 and pointing device, such as a mouse 742. Other input devices may include a microphone, joystick, game pad, satellite dish, digital camera, scanner, or the like. A digital camera or scanner 43 may be used to capture the target image for the detection process described above. The camera and scanner are each connected to the computer via a standard interface 44. Currently, there are digital cameras designed to interface with a Universal Serial Bus (USB), Peripheral Component Interconnect (PCI), and parallel port interface. Two emerging standard peripheral interfaces for cameras include USB2 and 1394 (also known as firewire and iLink).

Other input devices may be connected to the processing unit 721 through a serial port interface 746 or other port interfaces (e.g., a parallel port, game port or a universal serial bus (USB)) that are coupled to the system bus.

A monitor 747 or other type of display device is also connected to the system bus 723 via an interface, such as a video adapter 748. In addition to the monitor, computers typically include other peripheral output devices (not shown), such as speakers and printers.

The computer 720 operates in a networked environment using logical connections to one or more remote computers, such as a remote computer 749. The remote computer 749 may be a server, a router, a peer device or other common network node, and typically includes many or all of the elements described relative to the computer 720, although only a memory storage device 750 has been illustrated in FIG. 20. The logical connections depicted in FIG. 20 include a local area network (LAN) 751 and a wide area network (WAN) 752. Such networking environments are commonplace in offices, enterprise-wide computer networks, intranets and the Internet.

When used in a LAN networking environment, the computer 720 is connected to the local network 751 through a network interface or adapter 753. When used in a WAN networking environment, the computer 720 typically includes a modem 754 or other means for establishing communications over the wide area network 752, such as the Internet. The modem 754, which may be internal or external, is connected to the system bus 723 via the serial port interface 746.

In a networked environment, program modules depicted relative to the computer 720, or portions of them, may be stored in the remote memory storage device. The processes detailed above can be implemented in a distributed fashion, and as parallel processes. It will be appreciated that the network connections shown are exemplary and that other means of establishing a communications link between the computers may be used.

While the computer architecture depicted in FIG. 7 is similar to typical personal computer architectures, aspects of the invention may be implemented in other computer architectures, such as hand-held computing devices like Personal Digital Assistants, audio and/video players, network appliances, telephones, etc.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the watermark embedding and decoding processes may be implemented in a programmable computer or a special purpose digital circuit. Similarly, watermark decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

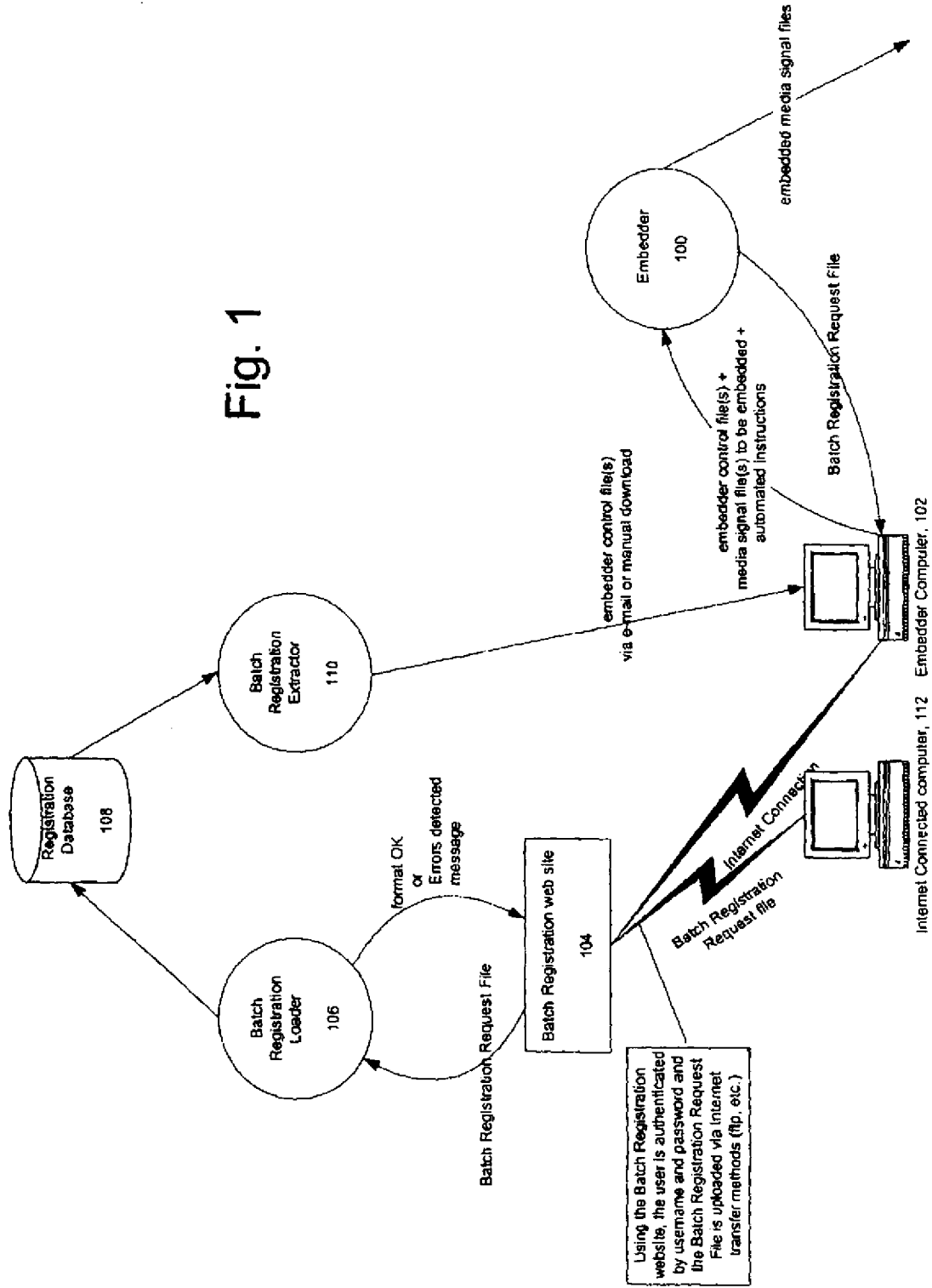

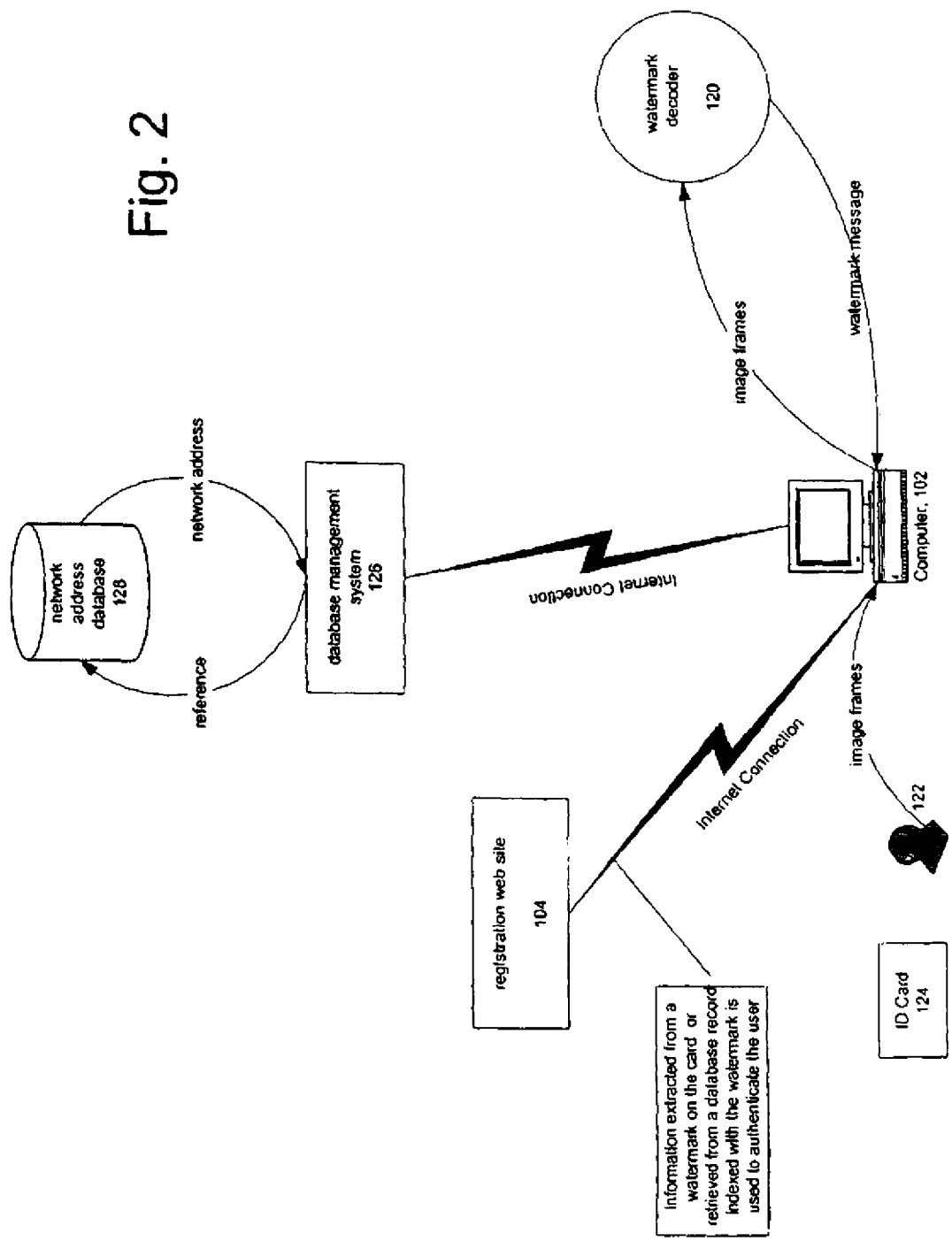

We claim:

1. A method of segmenting a media signal for parallel watermarking operations, the method comprising:
sub-dividing the media signal into segments based on analysis of the media signal to identify parts of media signal having signal characteristics that are more likely to carry a readable watermark signal;
analyzing the media signal to prioritize the segments of the media signal for digital watermark operations on the segments wherein the media signal segments are prioritized for digital watermark embedding operations and wherein the media signal segments are prioritized such that segments that are more likely to carry a readable watermark signal are given higher priority for the embedding operations;
distributing the prioritized segments to parallel processors; and
performing parallel digital watermark embedding operations on the prioritized segments in the parallel processors according to priority order of the prioritized segments.

2. A method of segmenting a media signal for parallel watermarking operations, the method comprising:
sub-dividing the media signal into segments;
distributing the segments to parallel processors; and
performing parallel digital watermark operations on the segments in the parallel processors wherein the media signal is segmented based on probability of watermark detection and prioritized for parallel watermark decoding operations based on probability of watermark detection.

3. The method of claim 2 wherein the parallel processors comprise threads of execution on one or more hardware processing units.

4. A distributed digital watermark embedder comprising:
a watermark signal generator for generating a watermark from a message;
a perceptual analyzer for perceptually analyzing a media signal and generating perceptual control parameters used to control application of the watermark to the media signal; and
a watermark applicator for receiving the media signal, the watermark and the perceptual control parameters, and for applying the watermark to the media signal according to the perceptual control parameters; wherein the watermark signal generator, the perceptual analyzer and the watermark applicator operate on distributed processors; wherein variable watermarks are embedded in copies of a media signal by executing the perceptual analyzer on the media signal once to generate a perceptual mask that is dependent on and automatically computed from the content of the media signal and is re-used by the watermark applicator to apply different watermarks from the watermark signal generator to the copies, the perceptual mask specifying areas of the media signal and is used to control embedding of the watermark in the areas.

5. The embedder of claim 4 wherein the distributed processors comprises independent threads of execution.

6. The embedder of claim 4 including a media signal segmentation processor for sub-dividing a media signal into segments for parallel processing in the embedder.

7. The embedder of claim 6 wherein the embedder includes plural perceptual analyzers, which operate in parallel on segments of the media signal.

8. The embedder of claim 6 wherein the embedder includes plural watermark signal applicators, which operate in parallel on segments of the media signal.

* * * * *

UNITED STATES PATENT AND TRADEMARK OFFICE
CERTIFICATE OF CORRECTION

| | | |
|---|---|---|
| PATENT NO. | : 8,355,525 B2 | Page 1 of 4 |
| APPLICATION NO. | : 10/053488 | |
| DATED | : January 15, 2013 | |
| INVENTOR(S) | : McKinley et al. | |

It is certified that error appears in the above-identified patent and that said Letters Patent is hereby corrected as shown below:

In the Drawings

On drawing sheets, consisting of Figs. 1, 2, 7, should be deleted to be replaced with the drawing sheets, consisting of Figs. 1, 2, 7, as shown on the attached pages.

In the Specification

In Column 3, Line 37, delete "embedder 100 software," and insert -- embedder software 100, --, therefor.

In Column 6, Line 48, delete "is to he" and insert -- is to be --, therefor.

In Column 7, Line 43, delete "camera;" and insert -- camera. --, therefor.

In Column 17, Line 6, delete "there many" and insert -- there are many --, therefor.

In Column 18, Line 9, delete "FIG. 6 is" and insert -- FIG. 6 is a --, therefor.

In Column 18, Line 57, delete "probablistic" and insert -- probabilistic --, therefor.

In Column 23, Line 5, delete "extreme" and insert -- extrema --, therefor.

In Column 23, Line 16, delete "Vol13 No 6," and insert -- Vol 13, No 6, --, therefor.

In Column 24, Line 50, delete "scanner 43" and insert -- scanner 743 --, therefor.

In Column 24, Line 53, delete "interface 44." and insert -- interface 744. --, therefor.

Signed and Sealed this
Eighteenth Day of March, 2014

Michelle K. Lee
*Deputy Director of the United States Patent and Trademark Office*